United States Patent
Oh et al.

(10) Patent No.: US 10,623,661 B2
(45) Date of Patent: Apr. 14, 2020

(54) IMAGE COMPOSITION METHOD WITH IMAGE SENSORS HAVING DIFFERENT ANGLES OF VIEW AND ELECTRONIC DEVICE FOR SUPPORTING THE SAME

(71) Applicant: SAMSUNG ELECTRONICS CO., LTD., Suwon-si, Gyeonggi-do (KR)

(72) Inventors: Seung Won Oh, Seoul (KR); Jung Sik Park, Suwon-si (KR); Jin Kyung Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 51 days.

(21) Appl. No.: 15/685,136

(22) Filed: Aug. 24, 2017

(65) Prior Publication Data
US 2018/0070023 A1    Mar. 8, 2018

(30) Foreign Application Priority Data
Sep. 7, 2016   (KR) .......................... 10-2016-0115219

(51) Int. Cl.
*H04N 5/222*    (2006.01)
*H04N 5/225*    (2006.01)
(Continued)

(52) U.S. Cl.
CPC ........... *H04N 5/2625* (2013.01); *G06T 5/002* (2013.01); *G06T 5/50* (2013.01); *G06T 7/11* (2017.01);
(Continued)

(58) Field of Classification Search
CPC ............. H04N 5/23232; H04N 5/2258; H04N 5/2226; H04N 5/2625; H04N 5/23293;
(Continued)

(56) References Cited

U.S. PATENT DOCUMENTS 7,512,262 B2 *   3/2009   Criminisi ........... G06K 9/00241
                                                     382/106
7,965,314 B1 *   6/2011   Miller ............... G08B 13/19643
                                                     250/330

(Continued)

OTHER PUBLICATIONS

Extended Search Report dated Feb. 19, 2018 in counterpart European Patent Application No. 17189196.3.

*Primary Examiner* — Ngoc Yen T Vu
(74) *Attorney, Agent, or Firm* — Nixon & Vanderhye P.C.

(57) ABSTRACT

An electronic device is provided. The electronic device includes a housing, a first image sensor configured to provide a first angle of view, a second image sensor configured to provide a second angle of view, and a processor. The processor is configured to obtain a first image having first resolution for a plurality of objects outside the electronic device, the plurality of objects corresponding to the first angle of view, to obtain a second image having second resolution for some objects corresponding to the second angle of view among the plurality of objects, to crop a third image having the second resolution, corresponding to at least part of the some objects, from the second image based on at least a depth-map using the first image and the second image, and to compose the third image with a region corresponding to the at least part of the some objects in the first image.

20 Claims, 16 Drawing Sheets

(51) Int. Cl.
*H04N 5/232* (2006.01)
*H04N 13/25* (2018.01)
*H04N 5/262* (2006.01)
*G06T 11/00* (2006.01)
*H04N 13/239* (2018.01)
*G06T 7/55* (2017.01)
*G06T 7/11* (2017.01)
*G06T 5/00* (2006.01)
*G06T 5/50* (2006.01)
*H04N 13/00* (2018.01)
*H04N 13/133* (2018.01)

(52) U.S. Cl.
CPC ............... *G06T 7/55* (2017.01); *G06T 11/00* (2013.01); *H04N 5/2226* (2013.01); *H04N 5/2258* (2013.01); *H04N 5/23232* (2013.01); *H04N 5/23293* (2013.01); *H04N 13/239* (2018.05); *H04N 13/25* (2018.05); *G06T 2207/10012* (2013.01); *G06T 2207/20132* (2013.01); *G06T 2207/20221* (2013.01); *H04N 13/133* (2018.05); *H04N 2013/0081* (2013.01); *H04N 2013/0088* (2013.01); *H04N 2013/0092* (2013.01)

(58) Field of Classification Search
CPC ... H04N 2013/0092; H04N 2013/0088; H04N 2013/0081; G06T 7/55; G06T 7/571; G06T 2207/20132; G06T 2207/20221; G06T 2007/10012

See application file for complete search history.

(56) References Cited

U.S. PATENT DOCUMENTS

| | | | |
|---|---|---|---|
| 8,493,432 B2* | 7/2013 | Taguchi | H04N 5/23238 348/36 |
| 9,154,684 B2 | 10/2015 | Lee et al. | |
| 9,208,396 B2* | 12/2015 | Nishiyama | G06T 5/50 |
| 9,460,513 B1* | 10/2016 | Ramalingam | G06K 9/00208 |
| 9,584,728 B2 | 2/2017 | Baek | |
| 9,813,615 B2* | 11/2017 | Lee | H04N 5/06 |
| 9,819,931 B2 | 11/2017 | Lee et al. | |
| 9,902,401 B2* | 2/2018 | Stein | B60W 40/06 |
| 9,918,065 B2* | 3/2018 | Geiss | H04N 5/23212 |
| 2011/0169921 A1 | 7/2011 | Lee et al. | |
| 2015/0206317 A1 | 7/2015 | Baek | |
| 2015/0296142 A1* | 10/2015 | Cappel-Porter | H04N 5/232 348/37 |
| 2015/0381967 A1 | 12/2015 | Lee et al. | |
| 2016/0117829 A1 | 4/2016 | Yoon et al. | |
| 2016/0227100 A1 | 8/2016 | Liu et al. | |
| 2018/0041748 A1 | 2/2018 | Lee et al. | |
| 2019/0290371 A1* | 9/2019 | Calef | H04N 5/2258 |

* cited by examiner

IMAGE COMPOSITION METHOD WITH IMAGE SENSORS HAVING DIFFERENT ANGLES OF VIEW AND ELECTRONIC DEVICE FOR SUPPORTING THE SAME

CROSS-REFERENCE TO RELATED APPLICATION

This application is based on and claims priority under 35 U.S.C. § 119 to a Korean patent application filed on Sep. 7, 2016 in the Korean Intellectual Property Office and assigned Serial number 10-2016-0115219, the disclosure of which is incorporated by reference herein in its entirety.

TECHNICAL FIELD

The present disclosure relates generally to image composition.

BACKGROUND

Recently, the distribution of various types of portable electronic devices, such as smartphones and tablet personal computers (PCs), has been expanded. The portable electronic device may include a plurality of cameras which may capture images.

The portable electronic device including the plurality of cameras may include cameras, each of which has a different angle of view. For example, a conventional portable electronic device may more clearly capture a specified subject using a telephoto lens or may capture an image of a wide viewing angle using a wide-angle lens. Meanwhile, when an image is captured using the conventional portable electronic device, a central object may be blurred if a wide-angle image is captured. Further, if an image is captured using a telephoto lens in the conventional electronic device, a surrounding landscape may be captured to be very narrow.

SUMMARY

Example aspects of the present disclosure address at least the above-mentioned problems and/or disadvantages and provide at least the advantages described below. Accordingly, an example aspect of the present disclosure is to provide an image composition method for obtaining an image including a wide viewing angle while properly maintaining resolution of a main subject and an electronic device for supporting the same.

In accordance with an example aspect of the present disclosure, an electronic device is provided. The electronic device may include a first image sensor located at one surface of a housing of the electronic device and configured to provide a first angle of view, a second image sensor located at the one surface of the housing and configured to provide a second angle of view and a processor operatively connected with the first image sensor and the second image sensor and configured to obtain a first image having first resolution for a plurality of objects located in the first angle of view of the first image sensor, to obtain a second image having second resolution for some objects located in the second angle of view from among the plurality of objects using the second image sensor, to crop a third image having the second resolution corresponding to at least part of the some objects from the second image based on at least a depth-map using the first image and the second image, and to compose the third image with a region corresponding to the at least part of the some objects in the first image.

In accordance with another example aspect of the present disclosure, the electronic device may include a first image sensor located at one surface of a housing of the electronic device and configured to provide a first angle of view, a second image sensor located at the one surface and configured to provide a second angle of view, a memory configured to store a first image captured by the first image sensor and to store a second image captured by the second image sensor and a processor electrically connected with the memory, wherein the processor is configured to crop an object from the second image based on a depth-map corresponding to the second image and to generate a composite image by composing the cropped object with the first image.

In accordance with another example aspect of the present disclosure, an image composition method is provided. The method may include obtaining a first image captured at a first angle of view and at first resolution in a first direction using a first image sensor of an electronic device including the first image sensor, a second image sensor, a memory, and a processor and obtaining a second image captured at a second angle of view and at a second resolution in the same or similar direction to the first direction using the second image sensor, cropping an object from the second image based on a depth-map generated based on at least part of the first image and at least part of the second image and generating a composite image by composing the cropped object with the first image.

Other aspects, advantages, and salient features of the disclosure will become apparent to those skilled in the art from the following detailed description, which, taken in conjunction with the annexed drawings, discloses various example embodiments of the present disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1A:
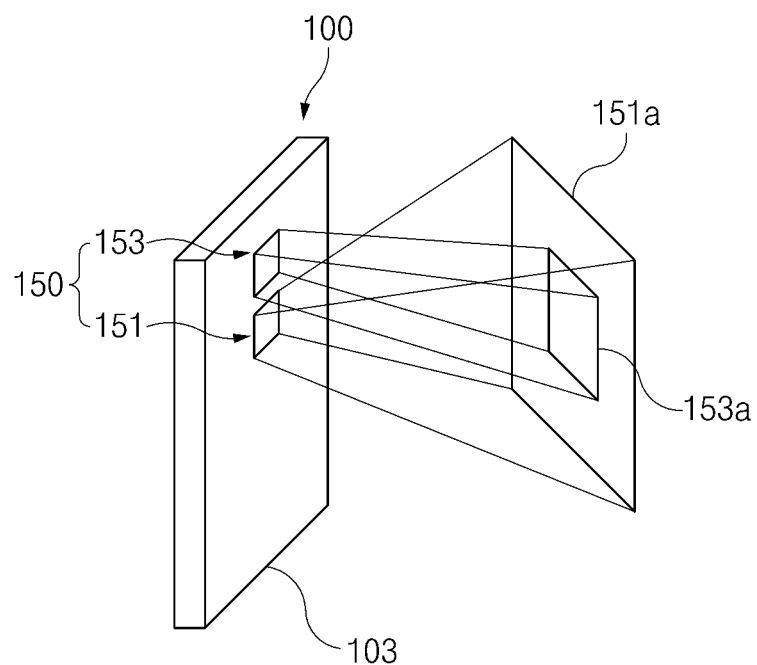
FIG. 1A is a diagram illustrating an example of the appearance of an electronic device according to an example embodiment of the present disclosure.

Various example embodiments of the present disclosure may be described with reference to accompanying drawings. Accordingly, those of ordinary skill in the art will recognize that modifications, equivalents, and/or alternatives of the various example embodiments described herein can be variously made without departing from the scope and spirit of the present disclosure. With regard to description of drawings, similar elements may be marked by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. On the other hand, when an element (e.g., a first element) is referred to as being "directly coupled with/to" or "directly connected to" another element (e.g., a second element), it should be understood that there is no intervening element (e.g., a third element).

According to the situation, the expression "configured to" used herein may be used interchangeably with, for example, the expression "suitable for", "having the capacity to", "designed to", "adapted to", "made to", or "capable of". The term "configured to" must not refer only to "specifically designed to" in hardware. Instead, the expression "a device configured to" may refer to a situation in which the device is "capable of" operating together with another device or other components. For example, a "processor configured to perform A, B, and C" may refer, for example, to a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, or the like, but is not limited thereto.

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like, but are not limited thereto.

According to another embodiment, the electronic device may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like), or the like, but is not limited thereto.

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like), or the like, but are not limited thereto. In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e. g., an artificial intelligence electronic device) that uses an electronic device.

Figure 1B:
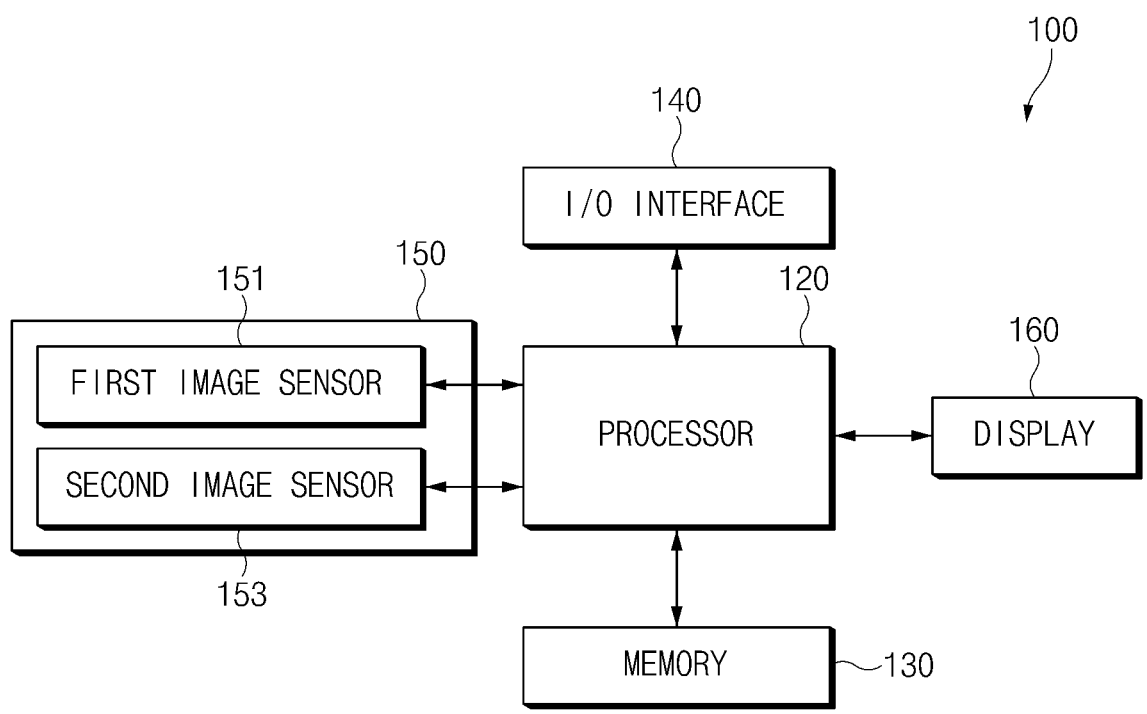
FIG. 1B is a block diagram illustrating an example configuration of an electronic device according to an example embodiment of the present disclosure.

FIG. 1A is a diagram illustrating an example of the appearance of an electronic device according to an example embodiment of the present disclosure. FIG. 1B is a block diagram illustrating an example configuration of an electronic device according to an example embodiment of the present disclosure.

Referring to FIGS. 1A and 1B, an electronic device 100 may include, for example, a housing 103 including an opening to expose at least part of a display 160 and a camera module 150 (or a camera device) having a first image sensor 151 (or a first camera module) and a second image sensor 153 (or a second camera module), which are located at one side of the housing 103. Further, the electronic device 100 according to an embodiment of the present disclosure may include a processor (e.g., including processing circuitry) 120, a memory 130, and an input/output (I/O) interface (e.g., including input/output circuitry) 140.

The housing 103 may include, for example, a first surface including a region opened in a first direction and a second surface closed in a second direction. The housing 103 may include at least one side wall between the first surface and the second surface. A hole in which the camera module 150 may be located may be located at at least one of the first surface or the second surface of the housing 103. In the drawing, an embodiment is illustrated as the camera module 150 is located at the second surface. The first image sensor 151 and the second image sensor 153 included in the camera module 150 may capture a subject located in the same or similar direction. According to an embodiment, a second angle of view 153a of the second image sensor 153 may be located within a first angle of view 151a of the first image sensor 151. Alternatively, the second angle of view 153a may be less than the first angle of view 151a and may be overlapped with at least a partial region of the first angle of view 151a. Thus, at least part (e.g., at least some subjects) of a first image captured by the first image sensor 151 and at least part (e.g., at least some subjects) of a second image captured by the second image sensor 153 may be overlapped with each other. According to an embodiment, resolution of the first image captured by the first image sensor 151 may differ from resolution of the second image captured by the second image sensor 153. For example, the resolution of the second image may be higher than the resolution of the first image with respect to the same size. The electronic device 100 may generate a composite image by composing (or synthesizing) pictures (or images) captured in the same or similar direction by the plurality of image sensors 151 and 153 or pictures (or images), at least some objects of which are the same as each other. The generated composite image may be stored in the memory 130 or may be output on the display 160. Alternatively, the composite image may be transmitted to an external electronic device via a communication interface included in the electronic device 100.

The memory 130 may store at least one instruction or program associated with operating the electronic device 100. According to an embodiment, the memory 130 may store an application program associated with operating the first image sensor 151 included in the camera module 150, an application program associated with operating the second image sensor 153, and a composite program for composing (or synthesizing) at least part of the at least one first image captured by the first image sensor 151 with at least part of the at least one second image captured by the second image sensor 153. The composite program may include, for example, an instruction configured to crop a partial region corresponding to a region of the second angle of view 153a of the second image sensor 153 from a first image region, an instruction configured to generate a depth-map based on the cropped region and the second image, an instruction configured to generate an out-of-focused composite image using the first image and the depth-map, and the like. Alternatively, the composite program may include an instruction configured to generate a modification image by applying blurring of a specified degree to the first image and an instruction configured to generate a composite image using the blurred modification image and the second image. Alternatively, the composite program may include an instruction configured to crop an object segmentation in the second image, an instruction configured to crop a main object segmentation using the second image and the depth-map, and an instruction configured to generate a composite image using the first mage and the main object segmentation. Alternatively, the composite program may generate a motion image (e.g., an image, a background of a subject of which is changed over time) using the composite image.

According to various embodiments, the memory 130 may store dual images which are the same or similar in image capture time, at least some subjects of which are overlapped with each other, captured using image sensors of different angles of view. The dual images stored in the memory 130 may be output on the display 160 in the form of a storage list. A format for storing the dual image may include, for example, a start of image (SOI), APP1 (exchangeable image file form (EXIF)), APP1 (dual info., metadata), APPn (Telen, Residual), image data (wide, legacy), DepthMap (raw, 8 bits), and an end of image (EOI) layer. The dual image may be stored according to an EXIF (DC-008) ver. 2.3 standard enacted/amended in a camera & imaging product association (CIPA) international standardization organization (ISO). The dual image and metadata standards may be assigned using an APPn marker code which permits basic joint photographic experts group (JPEG) extension. Thus, the dual image may be stored as one file in the memory 130. The dual image may be defined to include dual metadata information and the like according to an APP1 marker code declaration. Image information associated with the dual image may be assigned as a hierarchical structure using various zoom changes through a separate space in the same file. The processor 120 may include various processing circuitry and process a dual function (e.g., a function of composing the first image with the second image) based on the format for storing the dual image and may perform compatible processing of a lower model (e.g., a player terminal such as a television (TV)). Dual metadata associated with the dual image may include information such as a zoom magnification and offset designation. The dual metadata may be represented in various forms such as an integer, a floating point type, and American standard code for information interchange (ASCII) and may be extended to a tagged image file format (TIFF), an extensible metadata platform (XMP), or the like using technology for data exchange. At least one compression technology (e.g., a codec) may be applied in connection with the dual image, for example, differential pulse coded modulation (DPCM), motion estimation/motion compensation (ME/MC), or the like may be used.

The input/output (I/O) interface 140 may include various circuitry support an I/O function of the electronic device 100. For example, the I/O interface 140 may include at least one physical button. The at least one physical button may be configured to generate an input signal for instructing to capture an image for the same or similar subject using the first image sensor 151 and the second image sensor 153. According to various embodiments, the I/O interface 140 may include various circuitry, such as, for example, and without limitation, a touch pad or a touch screen which may generate an input signal according to a user input. The touch screen may be located at, for example, one side of the display 160. Thus, an element of the touch screen may be classified as an element of the display 160.

According to various embodiments, the I/O interface 140 may include an audio device. For example, the I/O interface 140 may include a speaker for outputting an audio signal associated with image capture of the first image sensor 151 and the second image sensor 153 or outputting a guide sound associated with generating a composite image. In addition, the audio device may include a microphone. The microphone may obtain a user voice signal corresponding to capturing a composite image and may transmit the obtained user voice signal to the processor 120. The processor 120 may execute a specified user function (e.g., generate a composite image) in response to the user voice signal obtained via the microphone. According to an embodiment, if a user speaks an audio signal corresponding to a "composite image" via the microphone, the processor 120 may perform auto-focusing (AF) by activating the camera module 150 and may obtain at least one first image based on the first image sensor 151 and at least one second image based on the second image sensor 153. Further, the processor 120 may automatically generate a composite image using the at least part of obtained first image and the at least part of obtained second image.

At least part of the display 160 may be exposed to the outside through the opening formed at one side of the housing 103. The display 160 may output at least one screen associated with operating the electronic device 100. For example, the display 160 may output a home screen where an icon for activating the camera module 150 or the like is located, a preview screen according to execution of the camera module 150, a screen which displays at least one image obtained according to an image capture request, a screen which displays a composite image of the obtained first image and the obtained second image, a screen which displays a motion image generated based on the composite image, or the like. According to an embodiment, the display 160 may output a storage list of images which are similar in image capture time, at least some objects of which are overlapped with each, captured using image sensors of different angles of view. The display 160 may output a composite image composed (or synthesized) based on the storage list in response to a user input signal for selecting the images included in the storage list and a user input signal for instructing to compose (or synthesize) the selected images.

The camera module 150 may be located such that at least part of the camera module 150 is exposed through a hole formed at one side of the housing 103. The camera module 150 may include the first image sensor 151 which may capture an image at first resolution with respect to a subject located within the first angle of view 151a and the second image sensor 153 which may capture an image at second resolution with respect to a subject located within the second angle of view 153a. In addition, the camera module 150 may further include a light source which provides necessary light upon capturing an image. At least part of the first angle of view 151a of the first image sensor 151 and at least part of the second angle of view 153a of the second image sensor 153 may be overlapped with each other. Thus, subjects located within the first angle of view 151a may include at least one subject located within the second angle of view 153a.

The first image sensor 151 may be located to be adjacent to the second image sensor 153 within a specific distance and may obtain an image for at least some objects located in the same or similar direction to a direction in which the second image sensor 153 may capture an image. The first image sensor 151 may capture a subject of a relatively wider region at relatively low resolution based on a wide-angle lens. The first image sensor 151 may include hardware and software which may perform a stabilization or AF function.

The second image sensor 153 may be located to be adjacent to the first image sensor 151 within a specified distance and may obtain an image including a subject located in the same or similar direction to a direction in which the first image sensor 151 may capture an image and a subject on a region around a subject of the second angle of view 153a (e.g., subjects located within the first angle of view 151a). The second image sensor 153 may capture a relatively distant subject at relatively high resolution based on a telephoto lens. The second image sensor 153 may include hardware and software which may perform the stabilization or AF function.

The processor 120 may process a signal associated with operating the electronic device 100. For example, the processor 120 may process signals associated with activating the first image sensor 151 and the second image sensor 153, outputting a preview image, and obtaining the first image and the second image. The processor 120 may generate at least one of a composite image and a motion image according to a specified scheme with respect to the obtained first image and the obtained second image.

As described above, the electronic device 100 according to an embodiment of the present disclosure may generate a composite image in which a background of a wide angle which is relatively wide is composed (or synthesized) with a central object of relatively high resolution, based on the first and second image sensors 151 and 153, may generate an out-of-focused composite image based on a blurred background, or may generate a motion image, a background of which is changed over time, based on the first and second sensors 151 and 153 which may capture images of different resolution.

Figure 2:
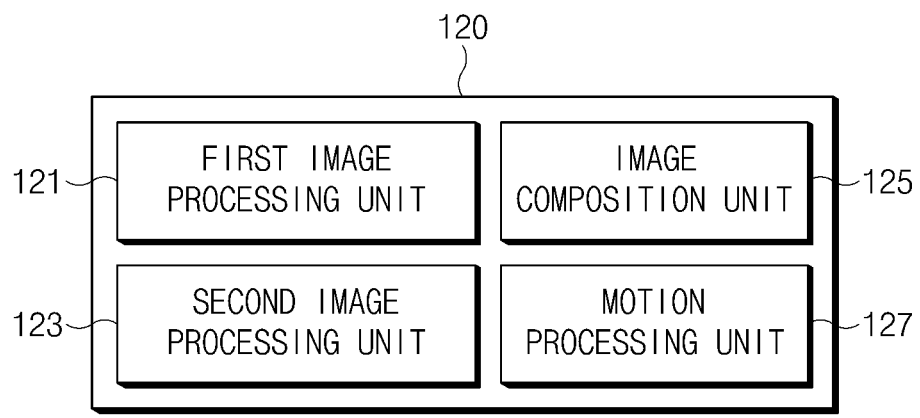
FIG. 2 is a block diagram illustrating an example configuration of a processor of an electronic device according to an example embodiment.

FIG. 2 is a block diagram illustrating an example configuration of a processor of an electronic device according to an example embodiment.

Referring to FIG. 2, a processor 120 according to an embodiment of the present disclosure may include a first image processing unit (e.g., including processing circuitry and/or program elements) 121, a second image processing unit (e.g., including processing circuitry and/or program elements) 123, an image composition unit (e.g., including processing circuitry and/or program elements) 125, and a motion processing unit (e.g., including processing circuitry and/or program elements) 127.

The first image processing unit 121 may include various processing circuitry and/or execute various program elements to activate a first image sensor 151 of FIG. 1B at a time when a second image sensor 153 of FIG. 1B is activated, according to a user input or a setting. If the first image sensor 151 obtains a first preview image, the first image processing unit 121 may output the obtained first preview image together with a second preview image obtained by the second image sensor 153 on a display 160 of FIG. 1B or may output any one of the first preview image or the second preview image on the display 160. Alternatively, the first image processing unit 121 may output the first preview image as a picture in picture (PIP) type, while the second preview image is output as a main preview image. The first image processing unit 121 may perform a focusing function on a specified subject among subjects located within a first angle of view 151 of FIG. 1A based on an AF function. The first image processing unit 121 may obtain a first image by executing an image capture function of the first image processing unit 121 according to a user input or a setting. According to an embodiment, the first image processing unit 121 may obtain a first image at substantially the same or similar time to a time when the second image sensor 153 obtains a second image or may obtain the first image within a constant time interval (e.g., immediately before or after the second image is obtained) with respect to a time when the second image is obtained. The first image processing unit 121 may provide the obtained first image to the image composition unit 125.

The second image processing unit 123 may include various processing circuitry and/or execute various program elements to activate or deactivate the second image sensor 153 of a camera module 150 of FIG. 1B according to a user input signal associated with generating a composite image. The second image processing unit 123 may activate, for example, the second image sensor 153 at substantially the same time as the first image sensor 151 or may activate the second image sensor 153 before or after the first image sensor 151 is activated. The second image processing unit 123 may output a preview image obtained by the activated second image processing unit 123 on the display 160 according to a setting. According to an embodiment, while the second preview image obtained from the second image sensor 153 is output on the display 160, an output of the first preview image obtained from the first image sensor 151 may be omitted. According to various embodiments, while the second image processing unit 123 outputs the first preview image obtained by the first image sensor 151 on a first specified region of the display 160, it may output the second preview image on a second specified region of the display 160. The second image processing unit 123 may focus a subject having a specified location or a specified shape among a plurality of subjects located within the second angle of view 153*a* based on an AF function, while a preview image is output. The second image processing unit 123 may capture an image of the second image sensor 153 and may transmit a second image obtained by the second image sensor 153 to the image composition unit 125, according to a user input or a setting. At least one subject included in the second image obtained based on the second image sensor 153 may be the same or similar to at least some of subjects included in the first image obtained based on the first image sensor 151.

If the first image and the second image are obtained, the image composition unit 125 which may include various processing circuitry and/or execute various program elements, may generate a composite image by composing the first image with the second image according to a specified scheme. According to an embodiment, the image composition unit 125 may provide at least one option (or menu) associated with generating the composite image. For example, the image composition unit 125 may provide a menu for selecting at least one of a first scheme of composing at least part of the second image (e.g., an image corresponding to a specified subject) on the first image, a second scheme of composing at least part of the second image on a blurred first image, and a third scheme of generating a motion image, a background of which is gradually changed. According to various embodiments, the image composition unit 125 may generate a composite image according to a specified scheme without providing a separate menu or may generate both of a composite image and a motion image according to the first to third schemes.

According to an embodiment, the image composition unit 125 may generate a composite image based on a dual image stored in a memory 130 of FIG. 1B (e.g., images obtained for a subject using a plurality of image sensors in a specified direction at substantially the same or similar time or images captured at different resolution in substantially the same direction at substantially the same time based on one electronic device including the plurality of image sensors). As described above, the dual image may include a depth-map. If a user input for requesting to generate a composite image is received, the image composition unit 125 may generate the composite image based on a first image (e.g., a wide-angle image) and a second image (e.g., a telephoto image) included in the dual image and the depth-map. The image composition unit 125 may store the generated composite image in the memory 130 or may transmit the generated composite image to a specified external electronic device, according to a user input. When storing the composite image in the memory 130, the image composition unit 125 may store the composite image in the form of being linked to a dual image stored in the memory 130.

According to an embodiment, the image composition unit 125 may generate an out-of-focused first composite image and a second composite image which is not out-of-focused (or a multi-focused second composite image). If a request to generate a motion image is received, the image composition unit 125 may transmit the out-of-focused first composite image and the multi-focused second composite image to the motion processing nit 127. The generating of the first composite image and the second composite image may be performed by the motion processing unit 127.

The motion processing unit 127 may include various processing circuitry and/or execute various program elements to receive the first composite image and the second composite image from the image composition unit 125 and may generate a motion image using the first composite image and the second composite image. For example, the motion processing unit 127 may generate a first motion image gradually changed from the first composite image to the second composite image or a second motion image gradually changed from the second composite image to the first composite image by changing transparency (or brightness) of the first composite image and transparency (or brightness) of the second composite image in a different way in a state where the first composite image is located on a lower layer and where the second composite image is located on an upper layer. According to various embodiments, if a request to output a motion image is received, the motion processing unit 127 may output the motion image without generating the motion image by obtaining the first composite image and the second composite image and may changing transparency of the first composite image and transparency of the second composite image in real time.

According to various embodiments, the motion processing unit 127 may generate a plurality of modification images by applying blurs of different degrees to the first image obtained based on the first image sensor 151. The motion processing unit 127 may generate the motion image by cropping a main subject (or a central object) from the second image obtained based on the second image sensor 153, composing the main subject with the plurality of modification images, and converting the plurality of composed composite images in the form of a video or slide.

According to various embodiments, an electronic device may include a memory configured to store a first image captured by a first image sensor which is located at a first surface of a housing of the electronic device and supports (or provides) a first angle of view and a second image captured by a second image sensor which is located at the first surface and supports (or provides) a second angle of view and a processor configured to be electrically connected with the memory. The processor may be configured to crop a central object from the second image based on a depth-map corresponding to the second image and generate a composite image by composing the central object with the first image.

According to various example embodiments, an electronic device is provided. The electronic device may include a first image sensor located at one surface of a housing of the electronic device and configured to provide a first angle of view, a second image sensor located at the one surface of the housing and configured to provide a second angle of view and a processor operatively connected with the first image sensor and the second image sensor and configured to obtain a first image having first resolution for a plurality of objects located in the first angle of view of the first image sensor, to obtain a second image having second resolution for some objects located in the second angle of view among the plurality of objects using the second image sensor, to crop a third image having the second resolution, corresponding to at least part of the some objects, from the second image based on at least a depth-map using the first image and the second image and to compose the third image with a region corresponding to the at least part of the some objects in the first image.

According to various example embodiments, the processor may be configured to process the first resolution to be higher than the second resolution.

According to various example embodiments, the processor may be configured to make at least part of the first image blurred as at least part of the composed third image.

According to various example embodiments, the electronic device may include a first image sensor located at one surface of a housing of the electronic device and configured provide a first angle of view, a second image sensor located at the one surface and configured to provide a second angle of view, a memory configured to store a first image captured by the first image sensor and a second image captured by the second image sensor and a processor electrically connected with the memory, wherein the processor is configured to crop an object from the second image based on a depth-map corresponding to the second image and to generate a composite image by composing the cropped object with the first image.

According to various example embodiments, the processor may be configured to obtain the first image and the second image within a time in the same or similar direction using the first image sensor and the second image sensor.

According to various example embodiments, the processor may be configured to crop a region corresponding to the second angle of view from the first image and generate the depth-map based on the at least cropped region and the at least second image.

According to various example embodiments, the processor may be configured to read the first image, the second image, and an image including the depth-map from the memory in response to receiving a user input.

According to various example embodiments, the processor may be configured to compose the cropped object with a location corresponding to the cropped object in the first image or blur the first image to a degree and compose the cropped object with a location corresponding to the cropped object in the blurred first image.

According to various example embodiments, the processor may be configured to blur the first image to a degree, generate an out-of-focused image based on the at least object extracted from the second image and generate the composite image by stitching the blurred first image and the out-of-focused image.

According to various example embodiments, the processor may be configured to crop an object segmentation from the second image and to generate the composite image by cropping a main object segmentation corresponding to the cropped object from the object segmentation based on the depth-map.

According to various example embodiments, the processor may be configured to blur the first image to a degree and generate a motion image configured to display a first composite image in which the cropped object is composed against a background of at least part of the first image and a second composite image in which a central object is composed against a background of at least part of the first image to be overlapped with each other and display the first composite image and the second composite image in a form where the second composite image is changed to the first composite image by adjusting a state where the first composite image is displayed and a state where the second composite image is displayed in a different way over time.

According to various example embodiments, the processor may be configured to perform at least one of: generating a third image by blurring the first image to a first degree, generating a fourth image by blurring the first image to a second degree, generating a fifth image by composing the third image with the cropped object, generating a sixth image by composing the fourth image with the cropped object and sequentially displaying the fifth image and the sixth image.

Figure 3:
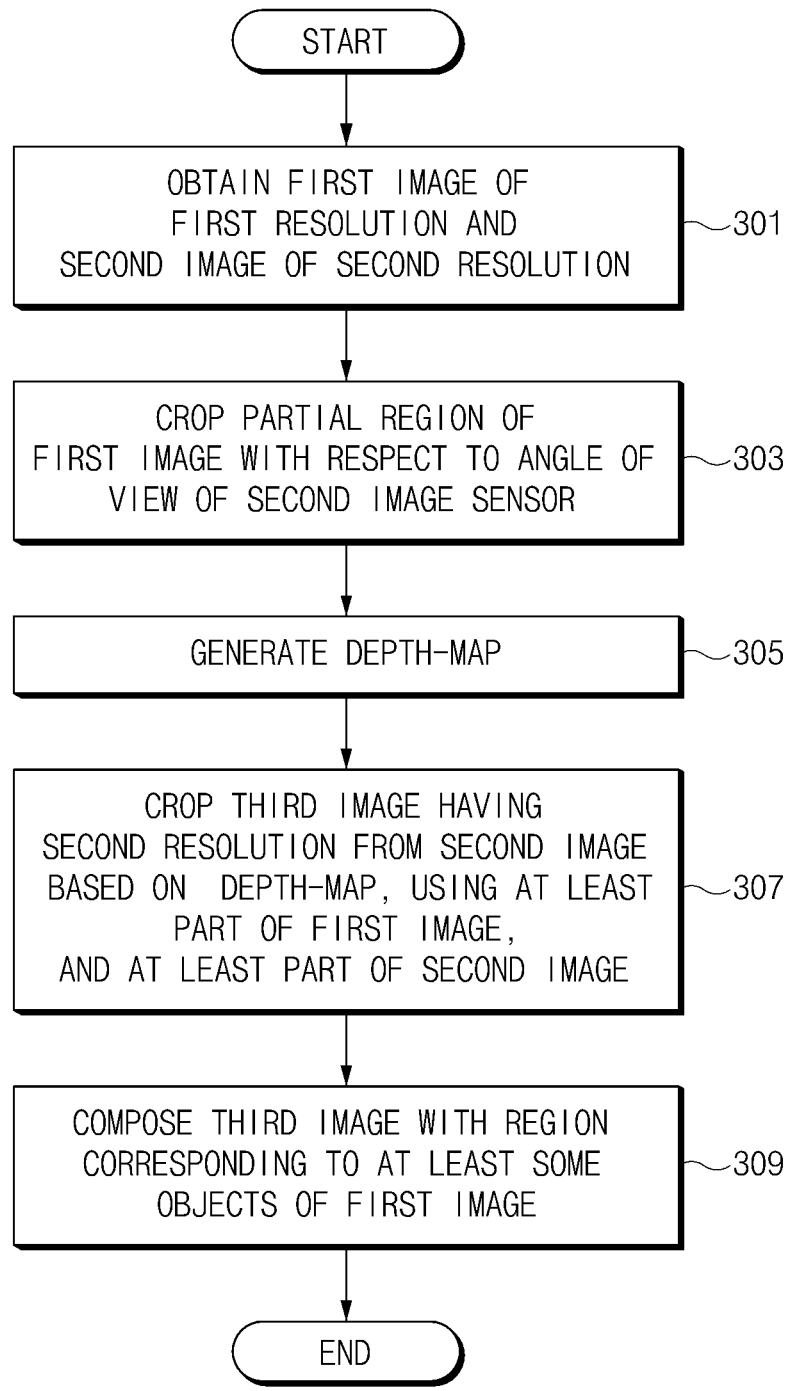
FIG. 3 is a flowchart illustrating an example image composition method according to an example embodiment of the present disclosure.

FIG. 3 is a flowchart illustrating an example image composition method according to an embodiment of the present disclosure.

Referring to FIG. 3, in connection with the image composition method according to an example embodiment of the present disclosure, in operation 301, a processor 120 (e.g., a first image processing unit 121 and a second image processing unit 123) of FIG. 2 may obtain a first image of first resolution and a second image of second resolution. For example, the processor 120 may capture the first image using a first image sensor 151 of FIG. 1B and may capture the second image using a second image sensor 153 of FIG. 1B. Alternatively, the processor 120 may read the first image of the first resolution and the second image of the second resolution from a memory 130 of FIG. 1B. Alternatively, the processor 120 may receive the first image and the second image (or a dual image) from an external electronic device.

In operation 303, the processor 120 (e.g., an image composition unit 125 of FIG. 2) may crop a partial region of the first image with respect to a second angle of view 153a of the second image 153. For example, the second angle of view 153a may be located within the partial region of the first image. Thus, the processor 120 may crop a partial region of a size and location corresponding to the second angle of view 153a from the first image.

In operation 305, the processor 120 (e.g., the image composition unit 125) may generate a depth-map. When detecting a subject from an image, the processor 120 may detect at least one subject using a similar color pattern, a boundary, or the like. The processor 120 may generate the depth-map according to a depth of the subjects located in the first and second images based on an object disparity between an object located in the second image and an object located in the cropped partial region of the first image. If the operation of obtaining the image in operation 301 is an operation of reading a dual image stored in the memory 130, in operation 305, the processor 120 may perform an operation of reading a depth-map included in the dual image.

In operation 307, the processor 120 (e.g., the image composition unit 125) may crop a third image having the second resolution, corresponding to a subject located on the partial region of the first image, from the second image based on at least a depth-map using the first image and the second image. For example, the processor 120 may detect a specified object using the depth-map and the second image. According to an embodiment, the processor 120 may crop a subject disposed at a specified location or an object located at a specified distance from an image capture point among a plurality of objects located on the second image at the second resolution.

In operation 309, the processor 120 (e.g., the image composition unit 125) may compose the third image with a region corresponding to at least part of the some objects of the first image. For example, the processor 120 (e.g., the image composition unit 125) may generate an out-of-focused composite image using the depth-map, at least part of the first image, and at least part of the second image. According to an embodiment, the processor 120 may generate an out-of-focused composite image by performing a blurring or out-of-focus operation of a background of a cropped object to a specified degree while maintaining second resolution of the cropped object. The processor 120 (e.g., the image composition unit 125) may store or display the generated composite image. For example, the processor 120 may output the composite image on a display 160 of FIG. 1B according to a default setting and may store the composite image in the memory 130 in response to a user input. In addition, the processor 120 may transmit the composite image to an external electronic device in response to a user input.

According to various embodiments, the electronic device 100 may obtain an out-of-focused second image when obtaining the first image based on the first image sensor 151 and may obtain an image for a specific object having the second resolution based on the second image sensor 153. The electronic device 100 may generate the composite image by composing a specific subject with a region corresponding to the second angle of view 153a in the first image or a region corresponding to the specific subject.

Figure 4:
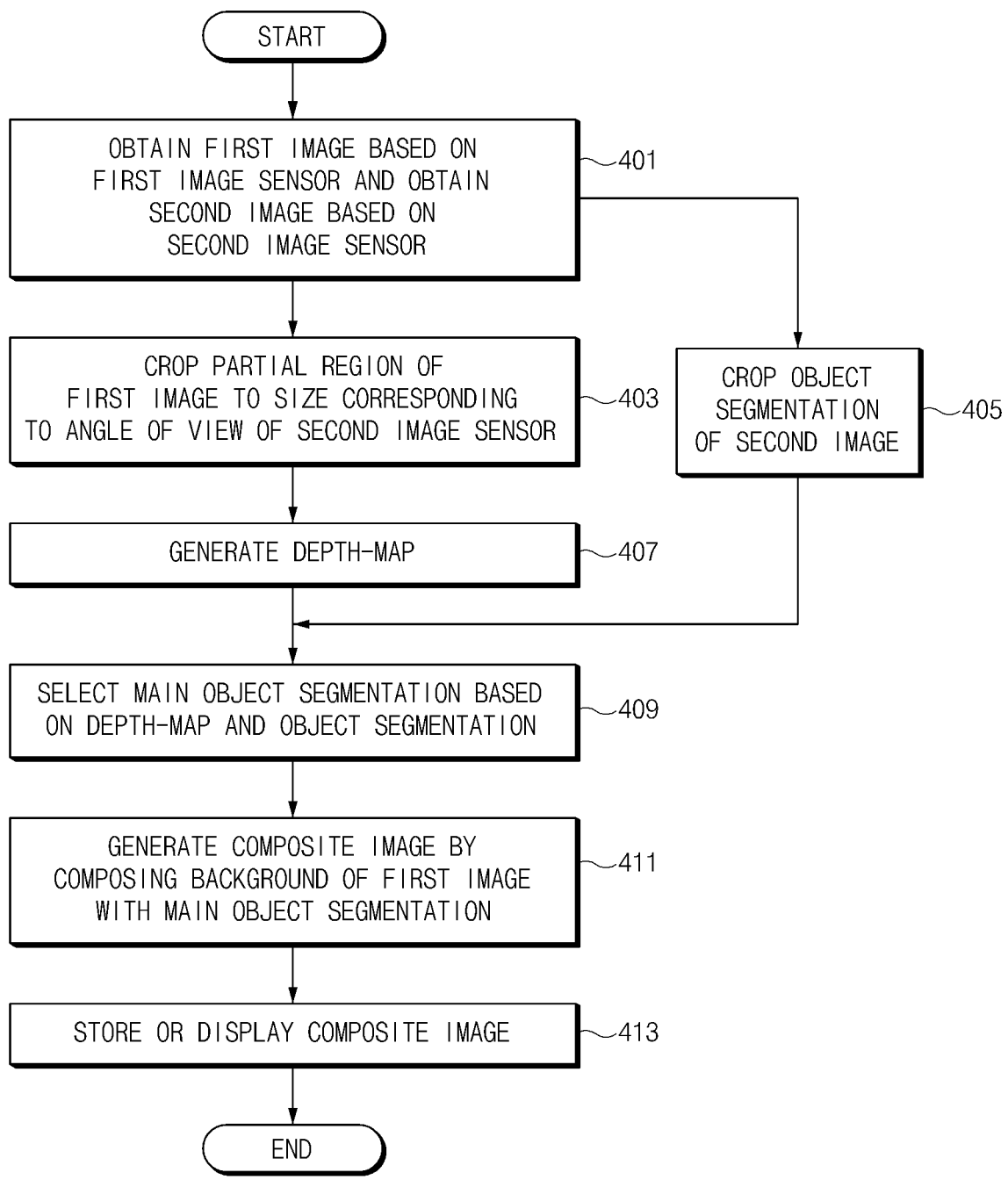
FIG. 4 is a flowchart illustrating an example image composition method for each object according to an example embodiment of the present disclosure.

FIG. 4 is a flowchart illustrating an example image composition method for each object according to an example embodiment of the present disclosure.

Referring to FIG. 4, in connection with the image composition method for each object according to an embodiment of the present disclosure, in operation 401, a processor 120 (e.g., a first image processing unit 121 or a second image processing unit 123) of FIG. 2 may obtain a first image based on a first image sensor 151 of FIG. 1B or may obtain a second image based on a second image sensor 153 of FIG. 1B. For example, the processor 120 may obtain the first image and the second image using the first image sensor 151 or the second image device 153, may obtain a dual image stored in a memory 130 of FIG. 1B, or may receive a dual image from an external electronic device. In operation 403, the processor 120 (e.g., an image composition unit 125 of FIG. 2) may crop a partial region of the second image to a size corresponding to a first angle of view 151a of the first image sensor 151.

In operation 405, the processor 120 (e.g., the image composition unit 125) may crop (or classify) an object segmentation of the second image. For example, the processor 120 may crop at least one object segmentation included in the second image based on cropping a boundary, a shadow, or a color pattern of the second image. Operations 403 and 405 may be simultaneously performed, or operation 405 may be performed earlier than operation 403.

In operation 407, the processor 120 (e.g., the image composition unit 125) may generate a depth-map. The generating of the depth-map may be performed in the same manner as that performed in operation 305 of FIG. 3. For example, the processor 120 may generate the depth-map through a comparison of a disparity between at least a partial region of the first image, corresponding to a second angle of view 153a, and the second image. Alternatively, the operation of generating the depth-map may be replaced with, for example, an operation of reading a depth-map from a dual image stored in the memory 130.

In operation 409, the processor 120 (e.g., the image composition unit 125) may select a main object segmentation based on the depth-map and the object segmentation. For example, the processor 120 may determine an object segmentation located at a constant distance from an image capture point or an object segmentation disposed at a specific location as the main object segmentation by comparing the depth-map with the object segmentation of the second image.

In operation 411, the processor 120 (e.g., the image composition unit 125) may generate a composite image by composing a background of the first image with the main object segmentation. In this operation, the processor 120 may generate the composite image by composing the main object segmentation on the first image based on a point where the main object segmentation is located (e.g., a location in the second image). For example, the processor 120 may compose the main object segmentation on a location corresponding to the second angle of view 153*a* in the first image.

In operation 413, the processor 120 may store or output the composed composite image in the memory 130 or may output the composed composite image on a display 160 of FIG. 1B, in response to a user input or set schedule information.

Figure 5:
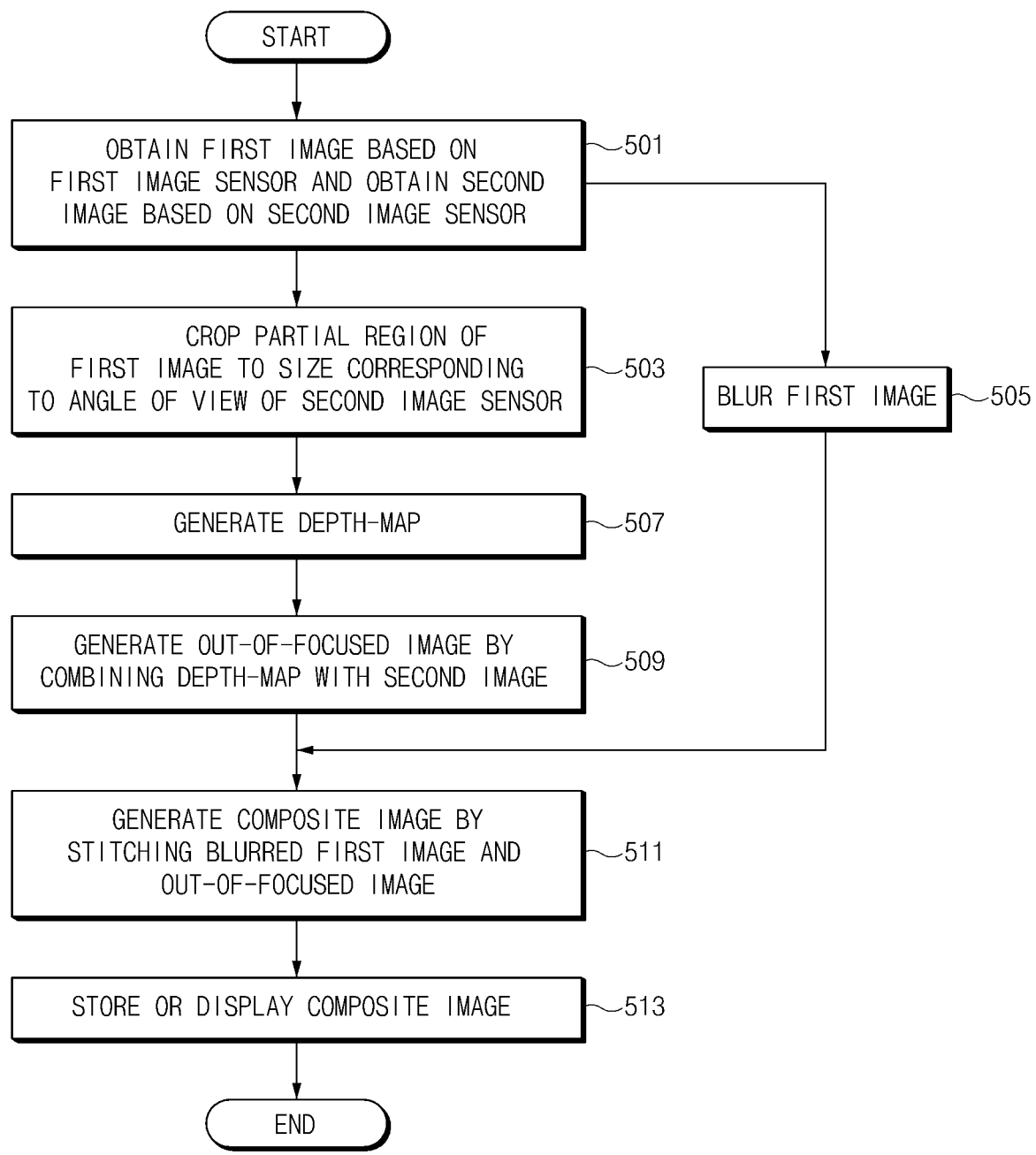
FIG. 5 is a flowchart illustrating an example image composition method based on a blurred background according to an example embodiment of the present disclosure.

FIG. 5 is a flowchart illustrating an example image composition method based on a blurred background according to an example embodiment of the present disclosure.

Referring to FIG. 5, in connection with the image composition method based on the blurred background according to an embodiment of the present disclosure, in operation 501, a processor 120 (e.g., a first image processing unit 121 and a second image processing unit 123) of FIG. 2 may obtain a first image based on a first image sensor 151 of FIG. 1B and may obtain a second image based on a second image sensor 153 of FIG. 1B. In operation 503, the processor 120 may crop (or classify) a partial region of the first image to a size corresponding to a second angle of view 153*a* of the second image sensor 153. The operation of obtaining the image and the operation of cropping the partial region of the first image may be substantially the same or similar to operation 401 of FIG. 4 or operation 301 of FIG. 3.

In operation 505, the processor 120 (e.g., an image composition unit 125 of FIG. 2) may blur the first image. For example, the processor 120 may process a boundary between objects of the first image to be dulled (or blurred). A degree of a blur applied to the first image may be changed according to a user setting. In this regard, an electronic device 100 of FIG. 1B may provide a user interface (UI) for adjusting a degree of an applied blur. If a degree of a blur according to user adjustment is relatively higher (or than a specified value), the processor 120 may process boundaries to be more dulled relatively (or by a first specified level). If the degree of the blur is lower relatively (or than the specified value), the processor 120 may process boundaries to be less dulled relatively (or by a second specified level).

In operation 507, the processor 120 (e.g., the image composition unit 125 of FIG. 2) may generate a depth-map. For example, the processor 120 may generate the depth-map by comparing a partial region in a range of a second angle of view 153*a* in the first image with the second image. According to various embodiments, if a dual image stored in a memory 130 of FIG. 1B is obtained in operation 501, the operation of generating the depth-map in operation 507 may be replaced with an operation of reading a depth-map included in the dual image.

In operation 509, the processor 120 (e.g., the image composition unit 125) may generate an out-of-focused image by combining the depth-map with the second image. For example, the processor 120 may determine an object disposed at a specified distance or location as a central object based on the depth-map and may perform an out-of-focus operation for a background around the central object. Operation 505 may be performed during any one of, for example, operations 503, 507, and 509 or may be performed immediately before or after operations 503, 507, and 509 are performed.

In operation 511, the processor 120 (e.g., the image composition unit 125) may generate a composite image by stitching the blurred first image and the out-of-focused image. For example, the processor 120 may apply the blurred first image to a background of the out-of-focused image and may apply an object cropped from the second image to the central object. Alternatively, the processor 120 may compose the blurred first image having first resolution with a background of the out-of-focused image and may locate at least part of the second image having second resolution on a region of the first image, corresponding to a second angle of view 153*a*.

In operation 513, the processor 120 (e.g., the image composition unit 125) may store the generated composite image in a memory 130 of FIG. 1B or may output the generated composite image on a display 160 of FIG. 1B, in response to a user input or set scheduling information.

Figure 6:
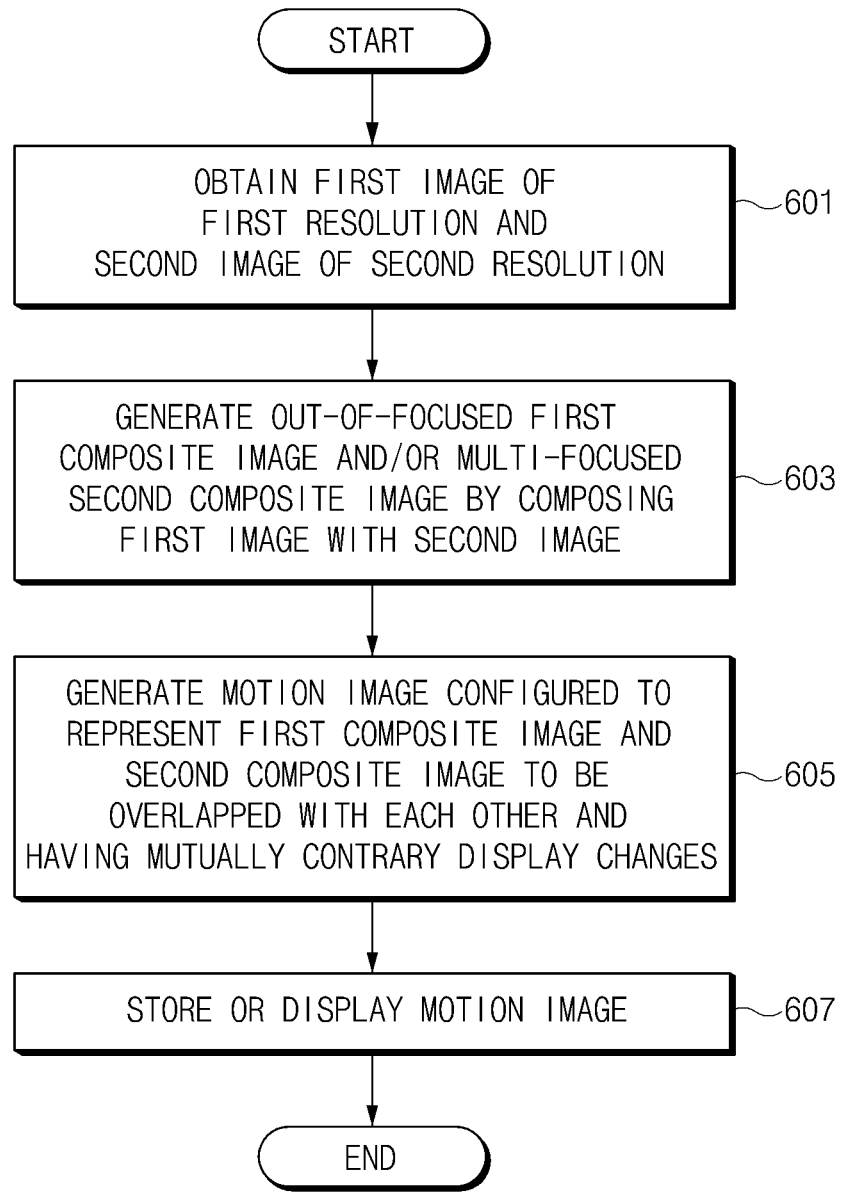
FIG. 6 is a flowchart illustrating an example motion image composition method according to an example embodiment of the present disclosure.

FIG. 6 is a flowchart illustrating an example motion image composition method according to an example embodiment of the present disclosure.

Referring to FIG. 6, in connection with the motion image composition method according to an embodiment of the present disclosure, in operation 601, a processor 120 (e.g., a first image processing unit 121 and a second image processing unit 123) of FIG. 2 may obtain a first image of first resolution and a second image of second resolution.

In operation 603, the processor 120 (e.g., an image composition unit 125 of FIG. 2) may generate at least one of an out-of-focused first composite image and a multi-focused second composite image by composing the first image with the second image. For example, the image composition unit 125 may generate an out-of-focused first composite image based on a manner described with reference to FIG. 5. Alternatively, the image composition unit 125 may generate a multi-focused second composite image in the form of locating the second image as a background of the first image according to a manner described with reference to FIG. 4. According to an embodiment, the first composite image and the second composite image may be of a form where their central objects are substantially the same as each other and where theirs backgrounds differ from each other.

In operation 605, the processor 120 (e.g., a motion processing unit 127 of FIG. 2) may generate a motion image configured to represent the first composite image and the second composite image to be overlapped with each other and having different (e.g., mutually contrary) display changes. For example, the processor 120 may generate a motion image on a screen in a form where the first composite image is gradually changed to the second composite image (e.g., a motion image in a manner where the first composite image is gradually faded out and where the second composite image is gradually faded in) by locating the first composite image and the second composite image to be overlapped with each other, gradually increasing transparency of the first composite image, and gradually decreasing transparency of the second composite image. Alternatively, the processor 120 may generate a motion image on a screen in a form where the second composite image is gradually changed to the first composite image by locating the first composite image and the second composite image to be overlapped with each other, gradually decreasing transparency of the first composite image, and gradually increasing transparency of the second composite image.

In operation 607, the processor 120 may store the motion image having the above-mentioned configuration in a memory 130 of FIG. 1B or may output the motion image on a display 160 of FIG. 1B, according to a user input or a setting.

Figure 7:
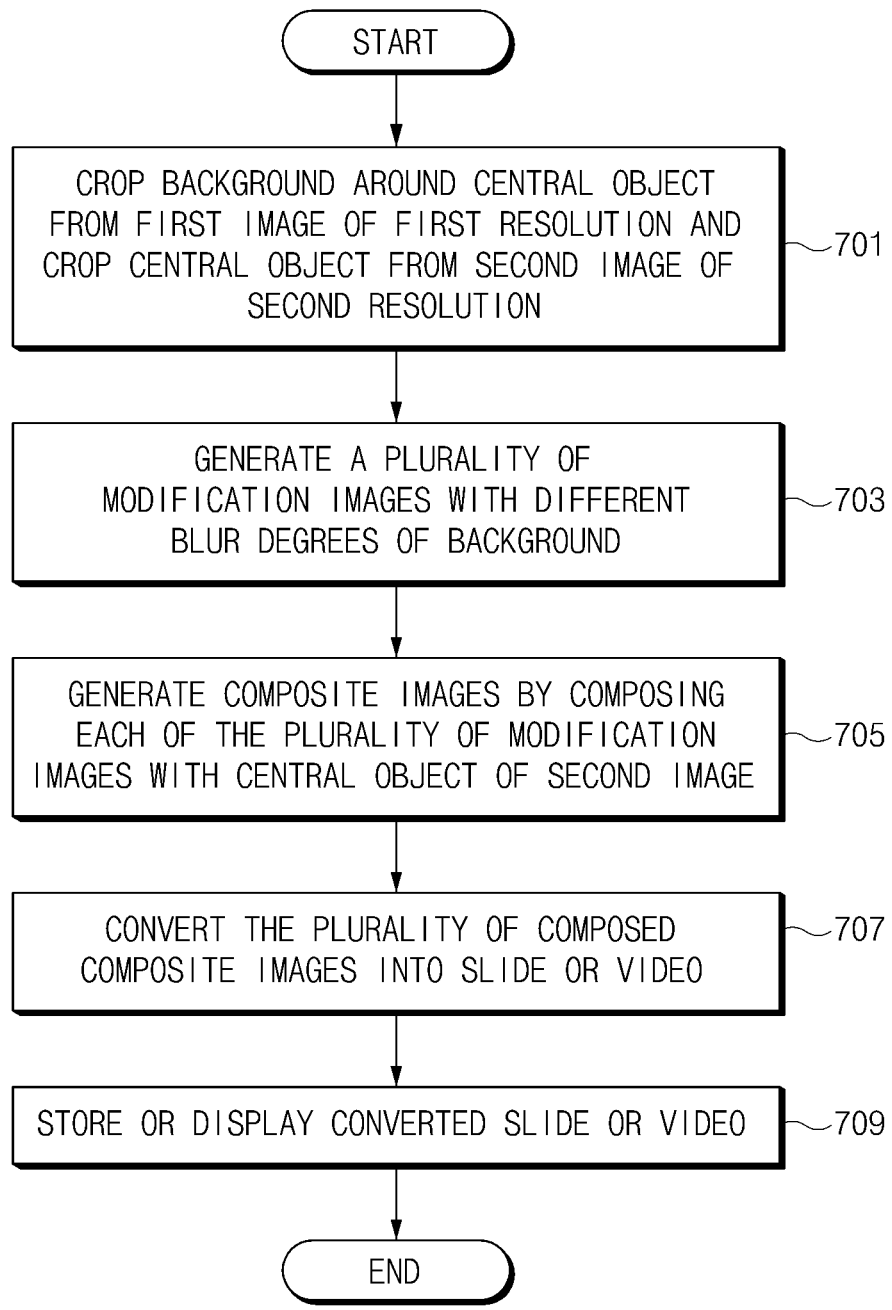
FIG. 7 is a flowchart illustrating another example motion image composition method according to an example embodiment of the present disclosure.

FIG. 7 is a flowchart illustrating another example motion image composition method according to an example embodiment of the present disclosure.

Referring to FIG. 7, in connection with the motion image composition method according to an embodiment of the present disclosure, in operation 701, a processor 120 (e.g., a motion processing unit 127) of FIG. 2 may crop a background around a central object from a first image of first resolution and may crop a central object from a second image of second resolution. In this regard, the processor 120 may obtain the first image and the second image and may crop the central object from the second image using a depth-map. If the central object is cropped, the processor 120 may crop a background of the first image, corresponding to a background around the extracted central object.

In operation 703, the processor 120 (e.g., the motion processing unit 127) may generate a plurality of modification images with different blur degrees of the background. In this operation, the processor 120 may generate the plurality of modification images to which a blur degree is applied in a different way, based on the first image. In operation 705, the processor 120 may generate composite images by composing each of the plurality of modification images with the central object of the second image. In operation 707, the processor 120 may convert the plurality of composed composite images into a slide or video. In operation 709, the processor 120 may store the converted slide or video in a memory 130 of FIG. 1B or may output the converted slide or video on a display 160 of FIG. 1B, according to a user input or a setting.

According to various example embodiments, an image composition method according to an embodiment may include obtaining a first image captured at a first angle of view and at first resolution in a first direction (e.g., a direction facing a housing face in which a camera module is located) and a second image captured at a second angle of view and at second resolution in the same or similar direction to the first direction, cropping a central object from the second image based on a depth-map generated based on at least part of the first image and at least part of the second image, and generating a composite image by composing the central object with the first image.

According to various example embodiments, an image composition method according to an embodiment may include obtaining a first image captured at a first angle of view and at first resolution in a first direction using a first image sensor at an electronic device including the first image sensor, a second image sensor, a memory, and a processor and obtaining a second image captured at a second angle of view and at second resolution in the same or similar direction to the first direction using the second image sensor, cropping an object from the second image based on a depth-map generated based on at least part of the first image and at least part of the second image and generating a composite image by composing the cropped object with the first image.

According to various example embodiments, the obtaining of the second image may include obtaining the first image and the second image within a time in the same or similar direction using the first image sensor and the second image sensor.

According to various example embodiments, the method may further include cropping a region corresponding to the second angle of view from the first image and generating the depth-map based on the at least cropped region and the at least second image.

According to various example embodiments, the generating of the composite image may include composing the cropped object with a location corresponding to the cropped object in the first image, blurring the first image to a degree, generating an out-of-focused image with respect to the object extracted from the second image and generating the composite image by stitching the blurred first image and the out-of-focused image.

According to various example embodiments, the method may further include blurring the first image to a degree and generating a motion image configured to display a first composite image in which the cropped object is composed against a background of at least part of the first image and a second composite image in which a central object is composed against a background of at least part of the first image to be overlapped with each other and display the first composite image and the second composite image in a form where the second composite image is changed to the first composite image by adjusting a state where the first composite image is displayed and a state where the second composite image is displayed in a different way over time.

According to various example embodiments, the method may further include outputting the motion image on a display of the electronic device and displaying the first composite image and the second composite image to vary in degree to which the second composite image is changed to the first composite image, in response to a user input.

According to various example embodiments, the method may further include at least one of generating a third image by blurring the first image to a first degree, generating a fourth image by blurring the first image to a second degree, generating a fifth image by composing the third image with the cropped object, generating a sixth image by composing the fourth image with the cropped object and sequentially displaying the fifth image and the sixth image.

According to various example embodiments, the generating of the composite image may include cropping an object segmentation from the second image and generating the composite image by cropping a main object segmentation corresponding to the object from the object segmentation based on the depth-map.

Figure 8:
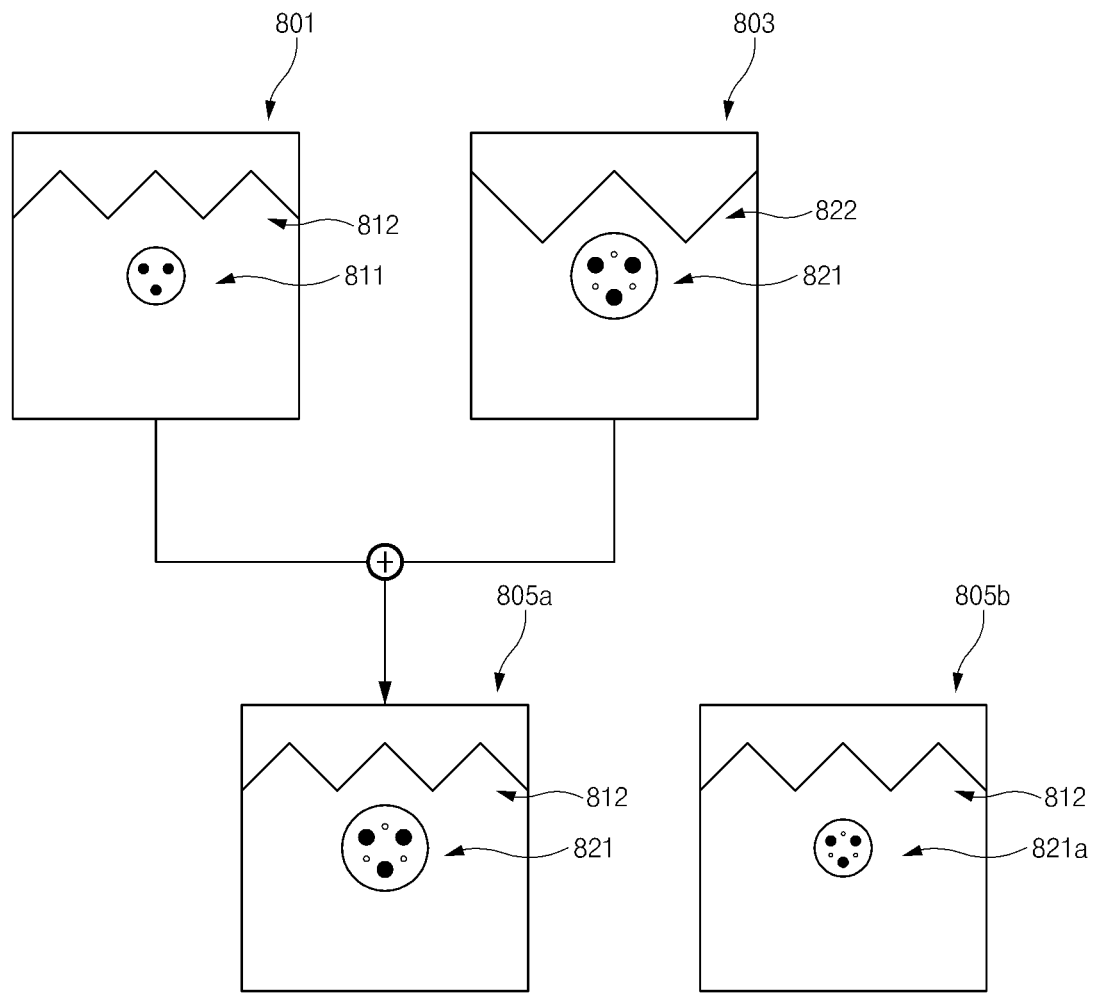
FIG. 8 is a diagram illustrating an example image composition in which a background is changed, according to an example embodiment of the present disclosure.

FIG. 8 is a diagram illustrating an example image composition in which a background is changed, according to an example embodiment of the present disclosure.

Referring to FIG. 8, an electronic device 100 of FIG. 1B may obtain a first image 801 and a second image 803. In connection with obtaining the first image 801 and the second image 803, a processor 120 of FIG. 1B may obtain the first image 801 based on a first image sensor 151 of FIG. 1B and may obtain the second image 803 based on a second image sensor 153 of FIG. 1B. Alternatively, the processor 120 may obtain the first image 801 and the second image 803 from a dual image stored in a memory 130 of FIG. 1B and may receive the first image 801 and the second image 803 from an external electronic device.

The electronic device 100 may generate a first composite image 805a or a second composite image 805b by composing the first image 801 with the second image 805. For example, the first image 801 may include a first central object 811 and a first background 812 (or a background object), and the second image 803 may include a second central object 821 and a second background 822. The first background 812 may include objects of a relatively wider angle than that of the second background 822. The second central object 821 may include an object captured at relatively higher resolution than that of the first central object 811.

The electronic device 100 may verify a region corresponding to a second angle of view 153a of the second image sensor 153 in the first image 801 (e.g., a partial region where the second central object 821 is located) according to the above-mentioned manner and may generate a depth-map corresponding to the region. The electronic device 100 may crop an object segmentation for the second image 803 to classify at least one subject. The electronic device 100 may extract a main object segmentation by applying the depth-map to the object segmentation. Herein, the main object segmentation may include the second central object 821 of the second image 803.

The electronic device 100 may generate the first composite image 805a by applying the second central object 821 to the first background 812 and locating the second central object 821 with respect to a point where the first central object 811 is located. Alternatively, the electronic device 100 may generate the second composite image 805b by downscaling a size of the second central object 821 by a size of the first central object 811 while maintaining resolution of the second central object 821 and locating a second central modification object 821a, in which the size of the second central object 821 is modified, on the point where the first central object 811 is located.

As described above, the electronic device 100 according to an embodiment may display a background image of a wide angle while displaying a central object of relatively high resolution by using an image captured at a wide angle as a background and using a central object of an image captured at a telephone angle as a central object.

Figure 9:
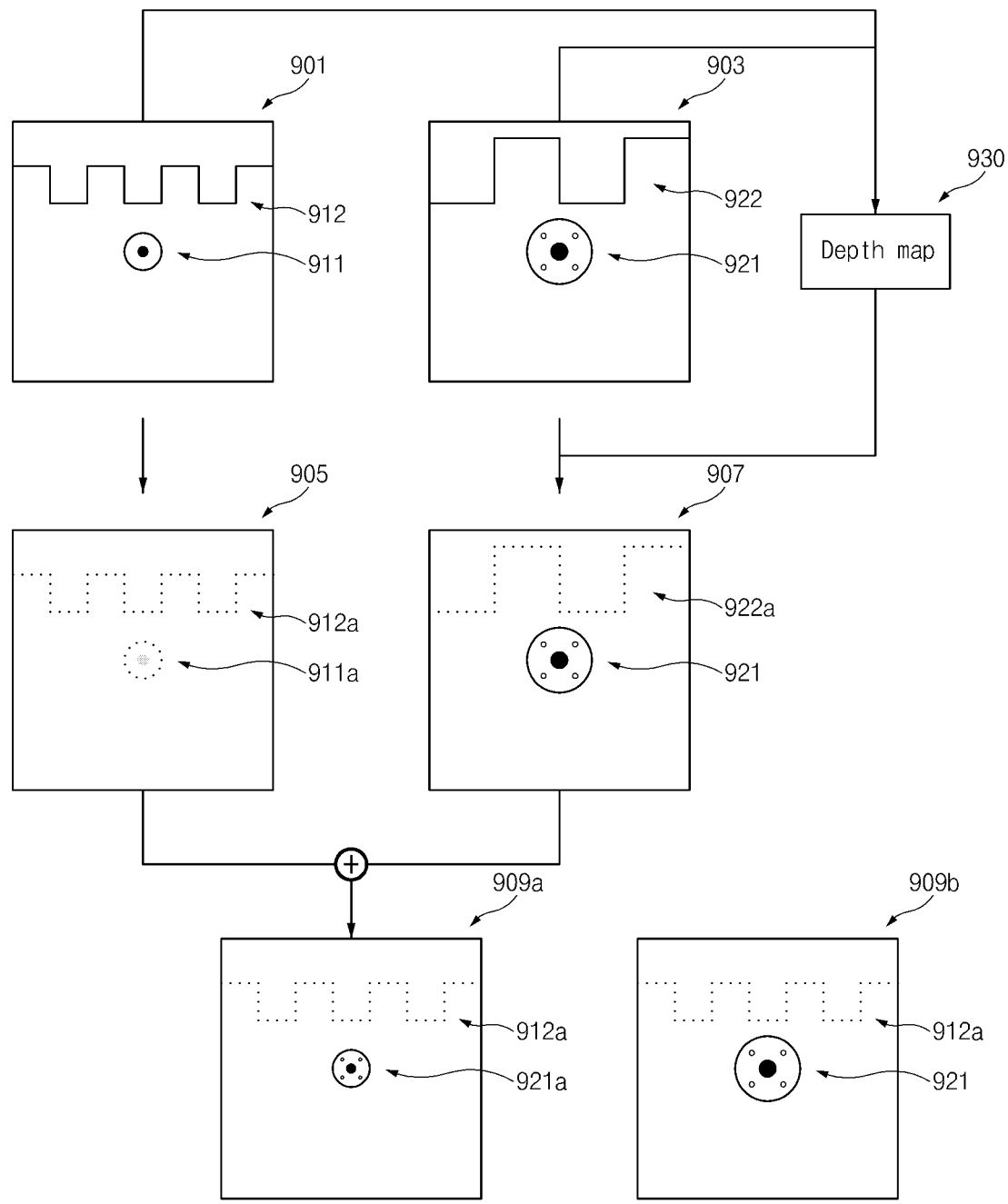
FIG. 9 is a diagram illustrating an example image composition to which a blurred background is applied, according to an example embodiment of the present disclosure.

FIG. 9 is a diagram illustrating an example image composition to which a blurred background is applied, according to an example embodiment of the present disclosure.

Referring to FIG. 9, an electronic device 100 of FIG. 1B may obtain a first image 901 and a second image 903. In connection with obtaining the first image 901 and the second image 903, the processor 120 may obtain at least one of the first image 901 or the second image 903 according to a manner described with reference to FIG. 8. The first image 901 may include, for example, a first background 912 and a first central object 911. The second image 903 may include, for example, a second background 922 and a second central object 921. The first central object 911 and the second central object 921 may be objects in which substantially the same subject is captured by cameras of different characteristics. For example, the first central object 911 may be an object displayed at relatively low first resolution for the same subject, and the second central object 921 may be an object displayed at relatively high second resolution for the same subject. The first background 912 may include an image corresponding to a subject captured at a relatively wide angle in the same or similar direction. The second background 922 may include an image corresponding to a subject captured at a relatively narrow angle in the same or similar direction.

The electronic device 100 may generate a depth-map 930 based on the first image 901 and the second image 903. For example, the electronic device 100 may apply a second angle of view 153a of a second image sensor 153 of FIG. 1B associated with the second image 903 to the first image 901 and may generate the depth-map based on a disparity value between the second image 903 and a partial region of the first image, cropped through the second angle of view 153a.

The electronic device 100 may generate an out-of-focused image 907 using the second image 903 and the depth-map 930. For example, the electronic device 100 may generate the out-of-focused image 907 including second central object 921 and out-focused second background 922a by focusing the second central object 921 disposed on a specific location of the depth-map 930 among objects located on the second image 903 and performing an out-of-focus operation for the second background 922 except for the focused second central object 921. The electronic device 100 may generate a blurred image 905 by applying a blur of a specified degree to the first image 901. The blurred image 905 may include, for example, a blurred first background 912a and a blurred first central object 911a.

The electronic device 100 may generate a first composite image 909a or a second composite image 909b by composing (e.g., stitching) the out-of-focused image 907 with the blurred image 905. According to an embodiment, the electronic device 100 may generate the first composite image 909a by applying part of the blurred image 905, for example, the blurred first background 912a, and a second central modification object 921a in which the second central object 921 is changed in size. Alternatively, the electronic device 100 may generate the second composite image 909b by applying the blurred first background 912a and the second central object 921.

Figure 10:
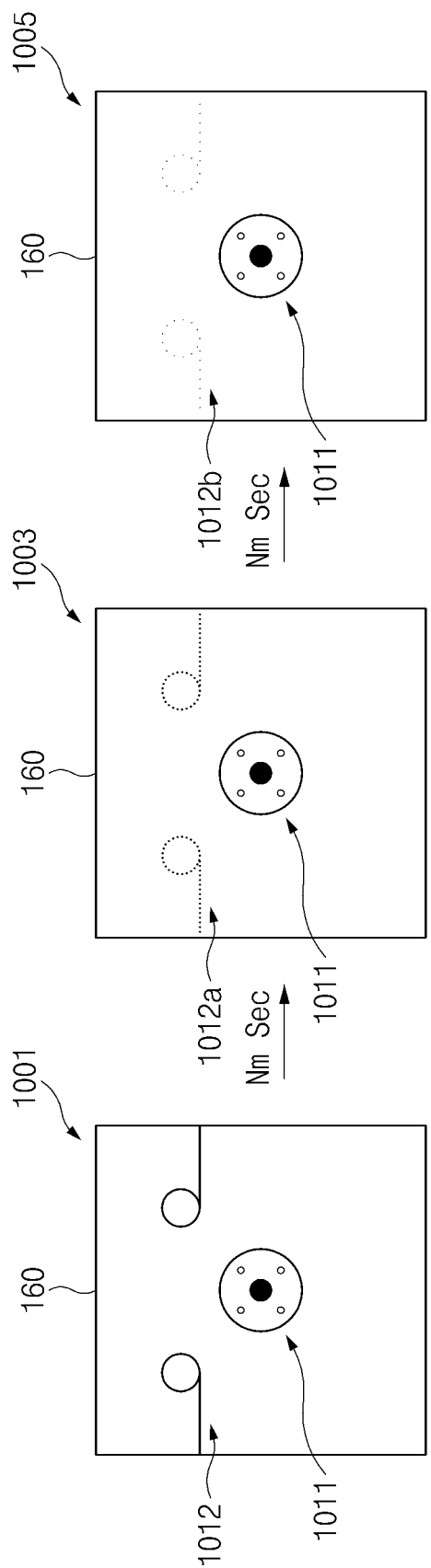
FIG. 10 is a diagram illustrating an example of displaying of a motion image according to an example embodiment of the present disclosure.

FIG. 10 is a diagram illustrating example displaying of a motion image according to an example embodiment of the present disclosure.

Referring to FIG. 10, an electronic device 100 of FIG. 1B may generate or obtain a motion image. In connection with obtaining the motion image, a processor 120 of FIG. 1B may generate a first composite image which includes an out-of-focused background or a blurred background and includes a second central object having second resolution and a second composite image which includes a background of a first image and includes a second central object having second resolution. The motion image may include an image configured to locate the first composite image and the second composite image to be overlapped with each other and to be output by decreasing transparency of the second composite image having a relatively clear background and increasing transparency of the first composite image having a relatively blurred background. The display 160 may output an initial motion image 1001 which includes a relatively clear composite background 1012 and a central object 1011 having relatively high resolution.

If the initial motion image 1001 is displayed and if a specified time Nmsec (N is a natural number) elapses, the display 160 may output a first motion image 1003. In connection with outputting the first motion image 1003, the processor 120 may output, for example, the first motion image 1003, a background of which is relatively blurred 1012a, on the display 160 by decreasing transparency of the first composite image and increasing transparency of the second composite image.

If the first motion image 1003 is displayed and if the specified time Nmsec elapses, the display 160 may output a second motion image 1005. In connection with outputting the second motion image 1005, the processor 120 may output, for example, the second motion image 1005, a background of which is relatively more blurred 1012b than a state of the first motion image 1003, on the display 160 by more decreasing transparency of the first composite image than an output state of the first motion image 1003 (e.g., reducing the transparency to a specified level or less to more clearly show the first composite image) and increasing transparency of the second composite image (e.g., more transparently setting the transparency than a previous state by setting the transparency to a specified level or more to less clearly show the second composite image). While a motion image is output in the above-mentioned manner, the first central object 1011 may be maintained in resolution. In case of a background, while the relatively clear first background 1012, a relatively blurred second background 1012a, and a relatively more blurred third object 1012b are output, a video or slide may be output in the form of being gradually changed in background.

According to various embodiments, the form of displaying the motion image displayed on the display 160 may vary according to a user input. For example, according to a distance where a touch of a user is dragged, a speed of a swipe event, or a scroll distance or speed, the electronic device 100 may adjust a degree of a change in display effect of the first composite image and a degree of a change in display effect of the second composite image in a different way. According to an embodiment, if a relatively slowly scrolled input event occurs, the electronic device 100 may relatively slowly apply a speed of a change in a display effect of each of the first composite image and the second composite image. Further, the electronic device 100 may relatively quickly apply a speed of a change in a display effect of each of the first and second composite images in response to a relatively quick scroll input event.

Meanwhile, an example embodiment is illustrated as the transparency is changed. However, the electronic device 100 may generate modification images by applying blurs of different degrees to the first resolution image (e.g., a wide-angle image) used as a background and may sequentially display a plurality of composite images, in which a central object cropped from the second resolution image (e.g., a telephoto image) is composed with each of the modification images, on the display 160. The number of the motion images may vary according to the number of changes in a degree of a blur. Further, a change time interval of the motion image may be changed according to a setting or a user input.

According to various embodiments, a display form of the motion image displayed on the display 160 may vary according to a user input. For example, the electronic device 100 may adjust a change speed of each of composite images and may display the adjusted composite images according to a distance where a touch of the user is dragged, a speed of a swipe event, or a scroll distance or speed.

Figure 11:
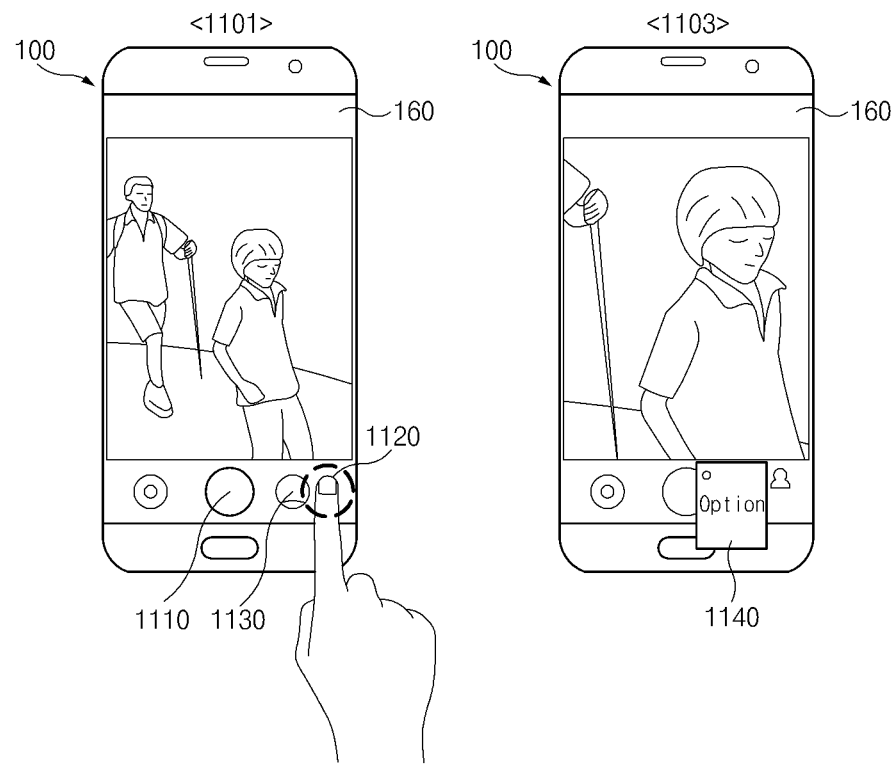
FIG. 11 is a diagram illustrating an example of a screen interface associated with capturing a composite image according to an example embodiment of the present disclosure.
Figure 11:
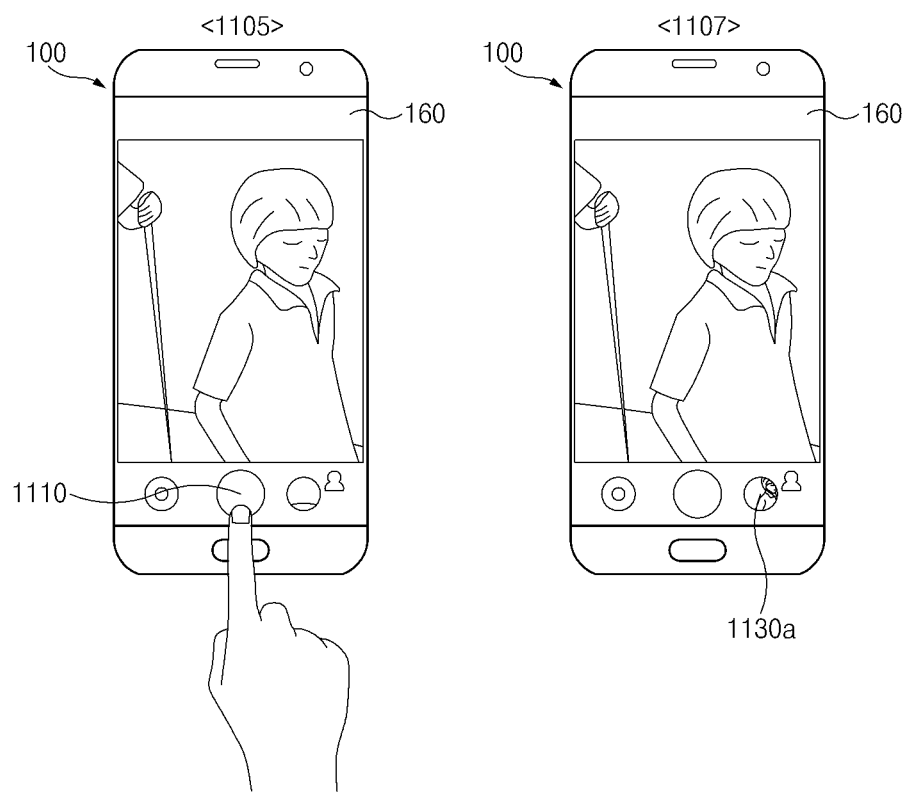

FIG. 11 is a diagram illustrating an example screen interface associated with capturing a composite image according to an example embodiment of the present disclosure.

Referring to FIG. 11, an electronic device 100 may activate a dual camera (e.g., a first image sensor 151 and a second image sensor 153 of FIG. 1B) in response to a request to activate a camera image capture function. In state 1101, the electronic device 100 may output a preview image obtained by at least one image sensor in the activated dual camera on a display 160. According to an embodiment, the electronic device 100 may output a preview image obtained by the first image sensor 151 (e.g., a telephoto camera) on the display 160. The display 160 may output a composite image icon 1120 associated with capturing a composite image, a virtual shutter icon 1110 associated with instructing image capture, and a gallery icon 1130 for displaying a thumbnail associated with a previously captured image and moving to a gallery when selected.

If a user input for selecting the composite image icon 1120 occurs, in state 1103, the electronic device 100 may output an option window 1140 for selecting at least one scheme associated with generating a composite image. The option window 1140 may include, for example, an item for selecting a first scheme of composing a background of a second image with a central object of a first image, a second scheme of composing a blurred background of the second image with the central object of the first image, a scheme of generating a motion image, or the like. After a specific scheme is selected on the option window 1140, if the virtual shutter icon 1110 is selected in state 1105, the electronic device 100 may capture an image. In this operation, the electronic device 100 may obtain a first image using the first image sensor 151, may obtain a second image using the second image sensor 153, and may generate at least one of a composite image and a motion image according to a selected scheme. If the image is generated, the electronic device 100 may a changed thumbnail image 1130a corresponding to the composite image or the motion image on a gallery icon region in state 1107.

Figure 12:
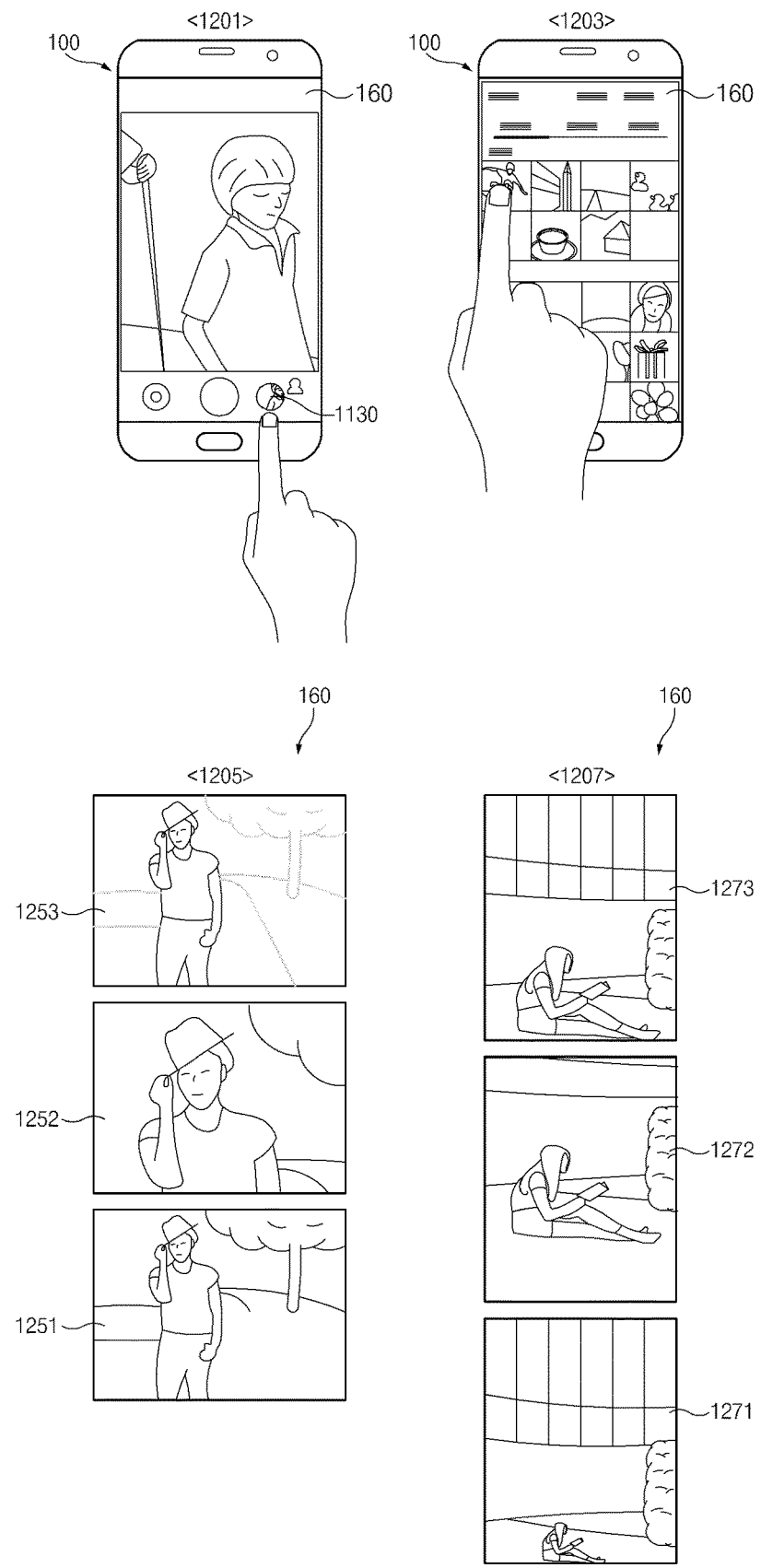
FIG. 12 is a diagram illustrating an example of a screen interface associated with generating a composite image based on a stored dual image according to an example embodiment of the present disclosure.

FIG. 12 is a diagram illustrating an example screen interface associated with generating a composite image based on a stored dual image according to an example embodiment of the present disclosure.

Referring to FIG. 12, if an input event for selecting a gallery event 1130 is received in state 1201 in a state where a preview image is output on a display 160 in response to activating a camera module, in state 1203, the electronic device 100 may output a screen where a gallery function is executed, on the display 160. Alternatively, the electronic device 100 may output an icon associated with executing the gallery function on a home screen or the like. If an input event for selecting the gallery icon 1130 occurs, in state 1203, the electronic device 100 may output the screen where the gallery function is executed, on the display 160.

On the screen where the gallery function is executed, if an event for requesting to generate a composite image or a motion image for specific images occurs, the electronic device 100 may generate the composite image or the motion image. In this regard, the electronic device 100 may support a function of generating a composite image or a motion image for only dual images among at least one image included in a gallery. Thus, the electronic device 100 may display dual images to be different from other single images. Thus, when a dual image is selected, the electronic device 100 may provide an option associated with generating a composite image or a motion image. When a single image is selected, the electronic device 100 may does not show the option or may show the option in an inactive state.

If a request to generate a composite image for a dual image is received, in state 1205, the electronic device 100 may display original images and a composite image. For example, the electronic device 100 may output a first resolution image 1251 (e.g., a wide-angle image), a second resolution image 1252 (e.g., a telephoto image), and a composite image 1253, having an out-of-focused background, to which a central object of the second resolution 1252 is applied, on the display 160.

Alternatively, if a request to generate the composite image for the dual image is received, in state 1207, the electronic device 100 may output a first resolution image 1271 (e.g., a wide-angle image), a second resolution image 1272 (e.g., a telephoto image), and a composite image 1273 in which a central object of the second resolution image 1272 is applied to a background including at least part of the first resolution image 1271 or a multi-focused composite image 1273, on the display 160.

As described above, various embodiments may generate an image having a wide angle of view and partially high resolution.

Figure 13:
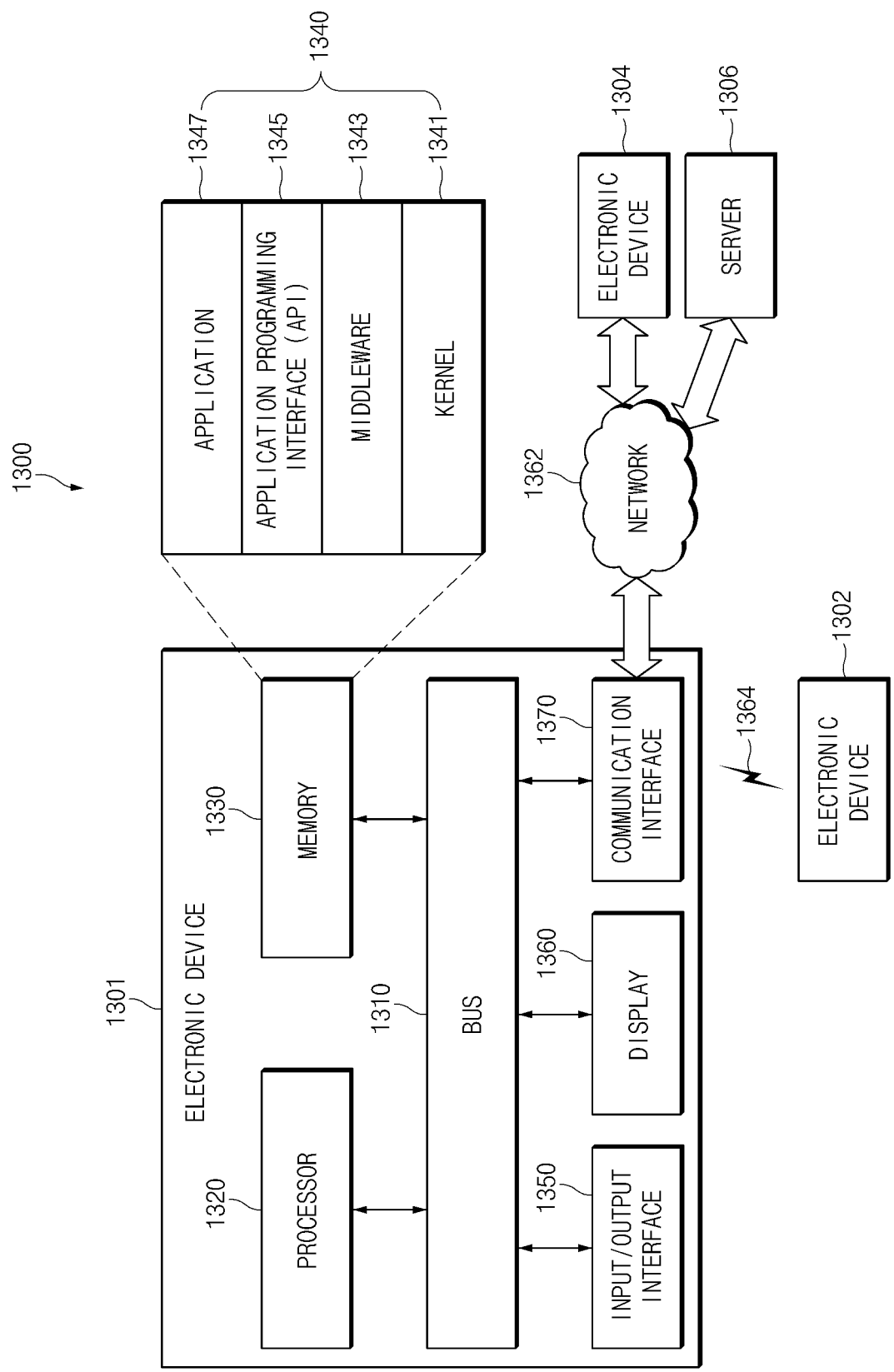
FIG. 13 is a block diagram illustrating an example configuration of an electronic device in a network environment according to an example embodiment.

FIG. 13 is a block diagram illustrating an example configuration of an electronic device in a network environment according to an example embodiment.

Referring to FIG. 13, in various embodiments, an electronic device 1301 and a first external electronic device 1302, a second external electronic device 1304, or a server 1306 may connect with each other through a network 1362 or local-area communication 1364. The electronic device 1301 may include a bus 1310, a processor (e.g., including processing circuitry) 1320, a memory 1330, an input/output interface (e.g., including input/output circuitry) 1350, a display 1360, and a communication interface (e.g., including communication circuitry) 1370. In various embodiments, at least one of the components may be omitted from the electronic device 1301, or other components may be additionally included in the electronic device 1301.

The bus 1310 may be, for example, a circuit which connects the components 1320 to 1370 with each other and transmits a communication signal (e.g., a control message and/or data) between the components.

The processor 1320 may include various processing circuitry, such as, for example, and without limitation, one or more of a dedicated processor, a central processing unit (CPU), an application processor (AP), or a communication processor (CP). For example, the processor 1320 may perform calculation or data processing about control and/or communication of at least another of the components of the electronic device 1301.

The memory 1330 may include a volatile and/or non-volatile memory. The memory 1330 may store, for example, a command or data associated with at least another of the components of the electronic device 1301. According to an embodiment, the memory 1330 may store software and/or a program 1340. The program 1340 may include, for example, a kernel 1341, a middleware 1343, an application programming interface (API) 1345, and/or an least one application program 1347 (or "at least one application"), and the like. At least part of the kernel 1341, the middleware 1343, or the API 1345 may be referred to as an operating system (OS).

The kernel 1341 may control or manage, for example, system resources (e.g., the bus 1310, the processor 1320, or the memory 1330, and the like) used to execute an operation or function implemented in the other programs (e.g., the middleware 1343, the API 1345, or the application program 1347). Also, as the middleware 1343, the API 1345, or the application program 1347 accesses a separate component of the electronic device 1301, the kernel 1341 may provide an interface which may control or manage system resources.

The middleware 1343 may play a role as, for example, a go-between such that the API 1345 or the application program 1347 communicates with the kernel 1341 to communicate data.

Also, the middleware 1343 may process one or more work requests, received from the application program 1347, in order of priority. For example, the middleware 1343 may assign priority which may use system resources (the bus 1310, the processor 1320, or the memory 1330, and the like) of the electronic device 1301 to at least one of the at least one application program 1347. For example, the middleware 1343 may perform scheduling or load balancing for the one or more work requests by processing the one or more work requests in order of the priority assigned to the at least one of the at least one application program 1347.

The API 1345 may be, for example, an interface in which the application program 1347 controls a function provided from the kernel 1341 or the middleware 1343. For example, the API 1345 may include at least one interface or function (e.g., a command) for file control, window control, image processing, or text control, and the like.

The input/output interface 1350 may include various input/output circuitry and play a role as, for example, an interface which may transmit a command or data input from a user or another external device to another component (or other components) of the electronic device 1301. Also, input and output interface 1350 may output an instruction or data received from another component (or other components) of the electronic device 1301 to the user or the other external device.

The display 1360 may include, for example, a liquid crystal display (LCD), a light emitting diode (LED) display, an organic LED (OLED) display, a microelectromechanical systems (MEMS) display, or an electronic paper display, or the like, but is not limited thereto. The display 1360 may display, for example, a variety of content (e.g., text, images, videos, icons, or symbols, and the like) to the user. The display 1360 may include a touch screen, and may receive, for example, touch, gesture, proximity, or a hovering input using an electronic pen or part of a body of the user.

The communication interface 1370 may include various communication circuitry and establish communication between, for example, the electronic device 1301 and an external device (e.g., a first external electronic device 1302, a second external electronic device 1304, or a server 1306). For example, the communication interface 1370 may connect to a network 1362 through wireless communication or wired communication and may communicate with the external device (e.g., the second external electronic device 1304 or the server 1306). Additionally, the communication interface 1370 may establish a short-range local-area wireless communication connection 1364 with another device, such as, for example, and without limitation, the first external electronic device 1302.

The wireless communication may use, for example, at least one of long term evolution (LTE), LTE-advanced (LIE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication 1364. The local-area communication 1364 may include, for example, at least one of wireless-fidelity (Wi-Fi) communication, Bluetooth (BT) communication, near field communication (NFC), or global navigation satellite system (GNSS) communication, and the like.

An MST module may generate a pulse based on transmission data using an electromagnetic signal and may generate a magnetic field signal based on the pulse. The electronic device 1301 may output the magnetic field signal to a point of sales (POS) system. The POS system may restore the data by detecting the magnetic field signal using an MST reader and converting the detected magnetic field signal into an electric signal.

The GNSS may include, for example, at least one of a global positioning system (GPS), a Glonass, a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network 1362 may include a telecommunications network, for example, at least one of a computer network (e.g., a local area network (LAN) or a wide area network (WAN)), the Internet, or a telephone network.

Each of the first and second external electronic devices 1302 and 1304 may be the same as or different device from the electronic device 1301. According to an embodiment, the server 1306 may include a group of one or more servers. According to various embodiments, all or some of operations executed in the electronic device 1301 may be executed in another electronic device or a plurality of electronic devices (e.g., the first external electronic device 1302, the second external electronic device 1304, or the server 1306). According to an embodiment, if the electronic device 1301 should perform any function or service automatically or according to a request, it may request another device (e.g., the first external electronic device 1302, the second external electronic device 1304, or the server 106) to perform at least part of the function or service, rather than executing the function or service for itself or in addition to the function or service. The other electronic device (e.g., the first external electronic device 1302, the second external electronic device 1304, or the server 1306) may execute the requested function or the added function and may transmit the executed result to the electronic device 1301. The electronic device 1301 may process the received result without change or additionally and may provide the requested function or service. For this purpose, for example, cloud computing technologies, distributed computing technologies, or client-server computing technologies may be used.

Figure 14:
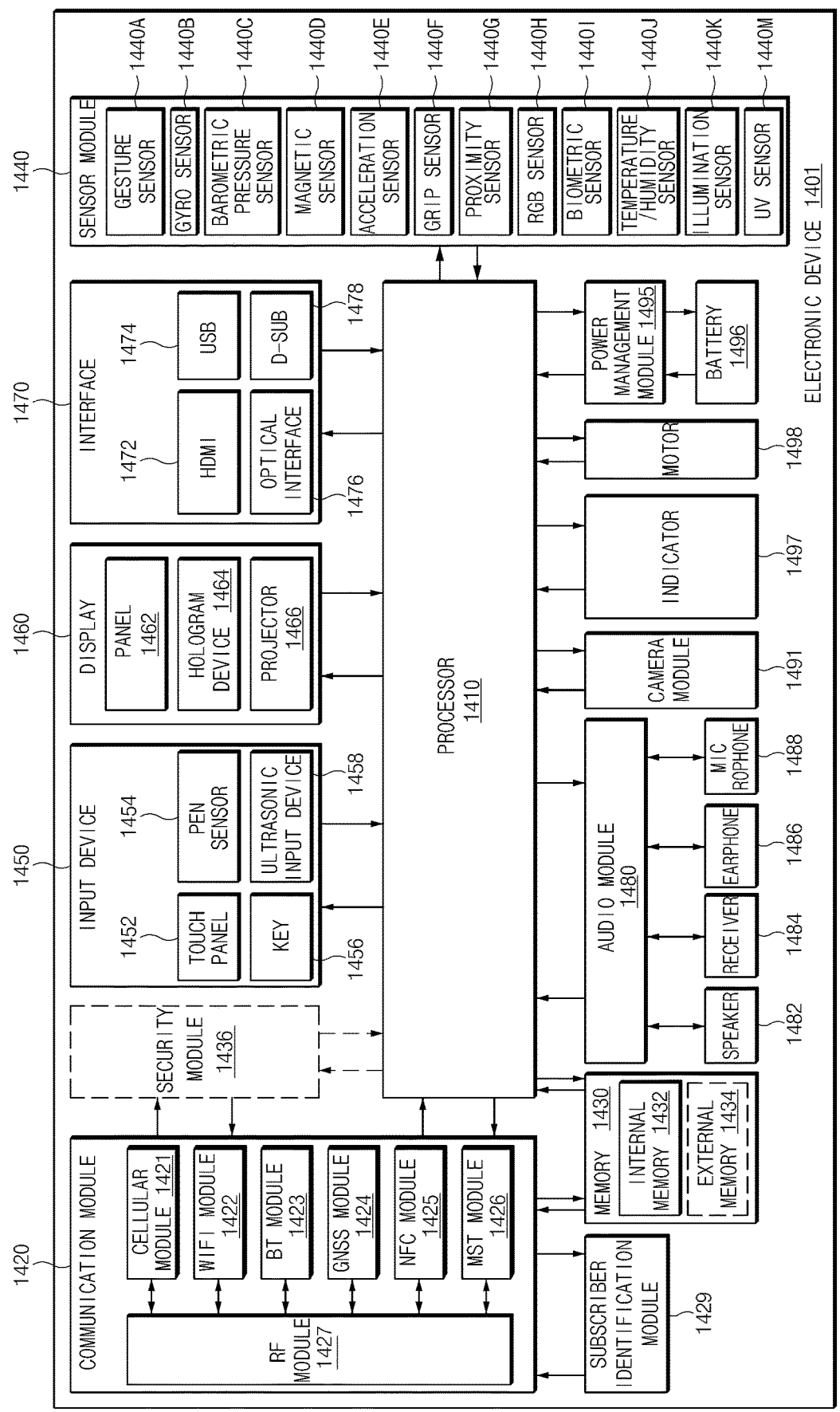
FIG. 14 is a block diagram illustrating an example configuration of an electronic device according to various example embodiments.

FIG. 14 is a block diagram illustrating an example configuration of an electronic device according to various example embodiments.

Referring to FIG. 14, the electronic device 1401 may include, for example, all or part of an electronic device 1301 illustrated in FIG. 13. The electronic device 1401 may include one or more processors (e.g., including processing circuitry) 1410 (e.g., application processors (APs)), a communication module (e.g., including communication circuitry) 1420, a subscriber identification module (SIM) 1429, a memory 1430, a security module 1436, a sensor module 1440, an input device (e.g., including input circuitry) 1450, a display 1460, an interface (e.g., including interface circuitry) 1470, an audio module 1480, a camera module 1491, a power management module 1495, a battery 1496, an indicator 1497, and a motor 1498.

The processor 1410 may include various processing circuitry and drive, for example, an operating system (OS) or an application program to control a plurality of hardware or software components connected thereto and may process and compute a variety of data. The processor 1410 may be implemented with, for example, a system on chip (SoC). According to an embodiment, the processor 1410 may include a graphic processing unit (GPU) (not shown) and/or an image signal processor (not shown). The processor 1410 may include at least some (e.g., a cellular module 1421) of the components shown in FIG. 14. The processor 1410 may load a command or data received from at least one of other components (e.g., a non-volatile memory) into a volatile memory to process the data and may store various data in a non-volatile memory.

The communication module 1420 may have the same or similar configuration to a communication interface 1370 of FIG. 13. The communication module 1420 may include various communication circuitry, such as, for example, and without limitation, the cellular module 1421, a wireless-fidelity (Wi-Fi) module 1422, a Bluetooth (BT) module 1423, a global navigation satellite system (GNSS) module 1424 (e.g., a GPS module, a Glonass module, a Beidou module, or a Galileo module), a near field communication (NFC) module 1425, an MST module 1426, and a radio frequency (RF) module 1427.

The cellular module 1421 may provide, for example, a voice call service, a video call service, a text message service, or an Internet service, and the like through a communication network. According to an embodiment, the cellular module 1421 may identify and authenticate the electronic device 1401 in a communication network using the SIM 1429 (e.g., a SIM card). According to an embodiment, the cellular module 1421 may perform at least part of functions which may be provided by the processor 1410. According to an embodiment, the cellular module 1421 may include a communication processor (CP).

The Wi-Fi module 1422, the BT module 1423, the GNSS module 1424, the NFC module 1425, or the MST module 1426 may include, for example, a processor for processing data transmitted and received through the corresponding module. According to various embodiments, at least some (e.g., two or more) of the cellular module 1421, the Wi-Fi module 1422, the BT module 1423, the GNSS module 1424, the NFC module 1425, or the MST module 1426 may be included in one integrated chip (IC) or one IC package.

The RF module 1427 may transmit and receive, for example, a communication signal (e.g., an RF signal). Though not shown, the RF module 1427 may include, for example, a transceiver, a power amplifier module (PAM), a frequency filter, or a low noise amplifier (LNA), or an antenna, and the like. According to another embodiment, at least one of the cellular module 1421, the Wi-Fi module 1422, the BT module 1423, the GNSS module 1424, the NFC module 1425, or the MST module 1426 may transmit and receive an RF signal through a separate RF module.

The SIM 1429 may include, for example, a card which includes a SIM and/or an embedded SIM. The SIM 1429 may include unique identification information (e.g., an integrated circuit card identifier (ICCID)) or subscriber information (e.g., an international mobile subscriber identity (IMSI)).

The memory 1430 (e.g., a memory 1330 of FIG. 13) may include, for example, an embedded memory 1432 and/or an external memory 1434. The embedded memory 1432 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1434 may include a flash drive, for example, a compact flash (CF), a secure digital (SD), a micro-SD, a mini-SD, an extreme digital (xD), a multimedia car (MMC), or a memory stick, and the like. The external memory 1434 may operatively and/or physically connect with the electronic device 1401 through various interfaces.

The security module 1436 may be a module which has a relatively higher secure level than the memory 1430 and may be a circuit which stores secure data and guarantees a protected execution environment. The security module 1436 may be implemented with a separate circuit and may include a separate processor. The security module 1436 may include, for example, an embedded secure element (eSE) which is present in a removable smart chip or a removable SD card or is embedded in a fixed chip of the electronic device 1401. Also, the security module 1436 may be driven by an OS different from the OS of the electronic device 1401. For example, the security module 1436 may operate based on a java card open platform (JCOP) OS.

The sensor module 1440 may measure, for example, a physical quantity or may detect an operation state of the electronic device 1401, and may convert the measured or detected information to an electrical signal. The sensor module 1440 may include at least one of, for example, a gesture sensor 1440A, a gyro sensor 1440B, a barometer (e.g., barometric pressure) sensor 1440C, a magnetic sensor 1440D, an acceleration sensor 1440E, a grip sensor 1440F, a proximity sensor 1440G, a color sensor 1440H (e.g., red, green, blue (RGB) sensor), a biometric sensor 1440I, a temperature/humidity sensor 1440J, an illumination sensor 1440K, or an ultraviolet (UV) sensor 1440M. Additionally or alternatively, the sensor module 1440 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1440 may further include a control circuit for controlling at least one or more sensors included therein. According to various embodiments, the electronic device 1401 may further include a processor configured to control the sensor module 1440, as part of the processor 1410 or to be independent of the processor 1410. While the processor 1410 is in a sleep state, the electronic device 1401 may control the sensor module 1440.

The input device 1450 may include various input circuitry, such as, for example, and without limitation, a touch panel 1452, a (digital) pen sensor 1454, a key 1456, or an ultrasonic input device 1458. The touch panel 1452 may use at least one of, for example, a capacitive type, a resistive type, an infrared type, or an ultrasonic type. Also, the touch panel 1452 may further include a control circuit. The touch panel 1452 may further include a tactile layer and may provide a tactile reaction to a user.

The (digital) pen sensor 1454 may be, for example, part of the touch panel 1452 or may include a separate sheet for recognition. The key 1456 may include, for example, a physical button, an optical key, or a keypad. The ultrasonic input device 1458 may allow the electronic device 1401 to detect a sound wave using a microphone (e.g., a microphone 1488) and to verify data through an input tool generating an ultrasonic signal.

The display 1460 (e.g., a display 1360 of FIG. 13) may include a panel 1462, a hologram device 1464, or a projector 1466. The panel 1462 may include the same or similar configuration to the display 160 or 1360. The panel 1462 may be implemented to be, for example, flexible, transparent, or wearable. The panel 1462 and the touch panel 1452 may be integrated into one module. The hologram device 1464 may show a stereoscopic image in a space using interference of light. The projector 1466 may project light onto a screen to display an image. The screen may be positioned, for example, inside or outside the electronic device 1401. According to an embodiment, the display 1460 may further include a control circuit for controlling the panel 1462, the hologram device 1464, or the projector 1466.

The interface 1470 may include various interface circuitry, such as, for example, and without limitation, a high-definition multimedia interface (HDMI) 1472, a universal serial bus (USB) 1474, an optical interface 1476, or a D-subminiature 1478. The interface 1470 may be included in, for example, a communication interface 1370 shown in FIG. 13. Additionally or alternatively, the interface 1470 may include, for example, a mobile high definition link (MHL) interface, an SD card/multimedia card (MMC) interface, or an infrared data association (IrDA) standard interface.

The audio module 1480 may convert a sound and an electric signal in dual directions. At least part of components of the audio module 1480 may be included in, for example, an input and output interface 1350 (or a user interface) shown in FIG. 13. The audio module 1480 may process sound information input or output through, for example, a speaker 1482, a receiver 1484, an earphone 1486, or the microphone 1488, and the like.

The camera module 1491 may be a device which captures a still image and a moving image. According to an embodiment, the camera module 1491 may include one or more image sensors (not shown) (e.g., a front sensor or a rear sensor), a lens (not shown), an image signal processor (ISP) (not shown), or a flash (not shown) (e.g., an LED or a xenon lamp).

The power management module 1495 may manage, for example, power of the electronic device 1401. According to an embodiment, though not shown, the power management module 1495 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1496 and voltage, current, or temperature thereof while the battery 1496 is charged. The battery 1496 may include, for example, a rechargeable battery or a solar battery.

The indicator 1497 may display a specific state of the electronic device 1401 or part (e.g., the processor 1410) thereof, for example, a booting state, a message state, or a charging state, and the like. The motor 1498 may convert an electric signal into mechanical vibration and may generate vibration or a haptic effect, and the like. Though not shown, the electronic device 1401 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 15:
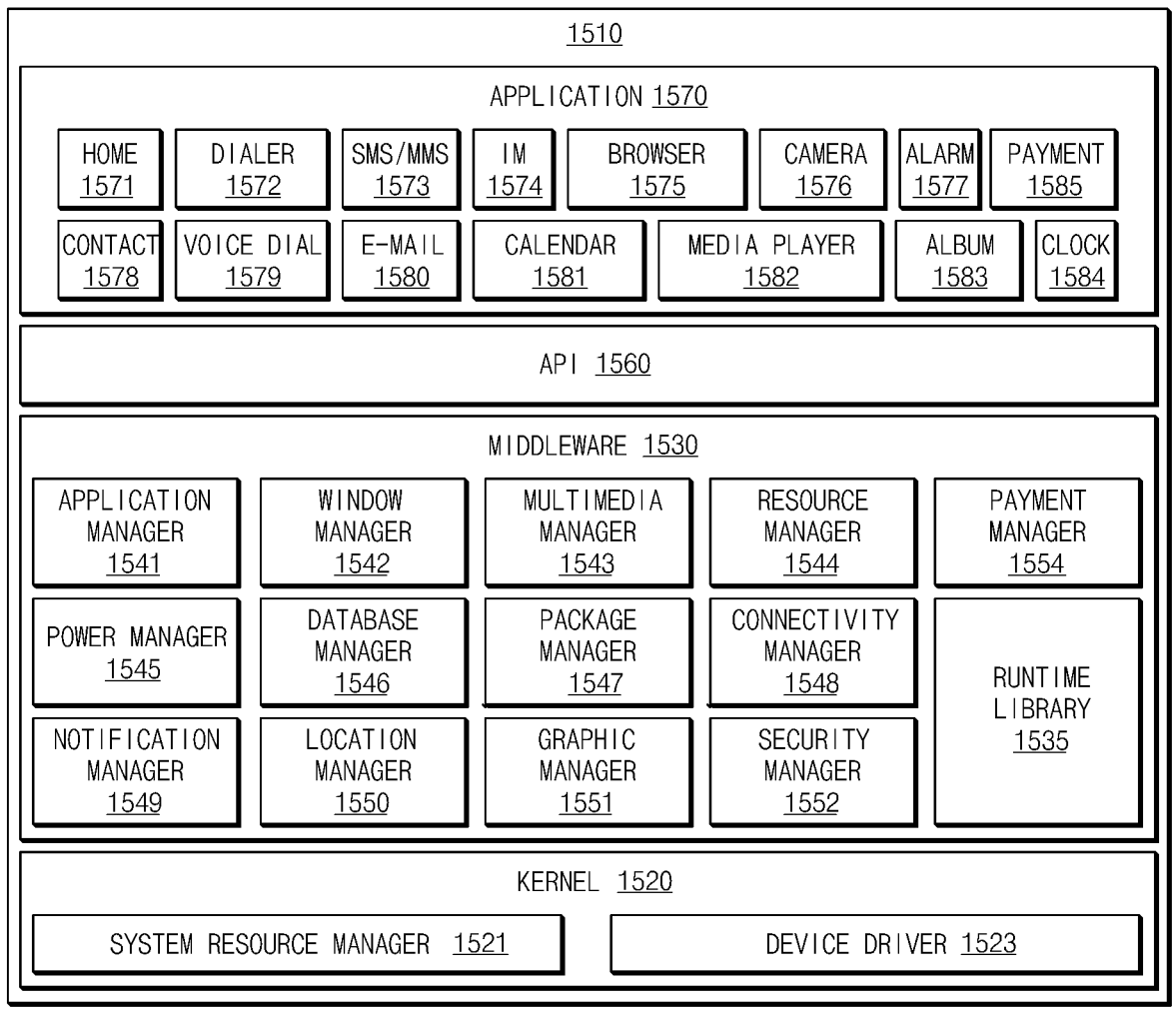
FIG. 15 is a block diagram illustrating an example configuration of a program module according to various example embodiments.

FIG. 15 is a block diagram illustrating an example configuration of a program module according to various example embodiments.

According to an embodiment, the program module 1510 (e.g., a program 1340 of FIG. 13) may include an operating system (OS) for controlling resources associated with an electronic device (e.g., an electronic device 1301 of FIG. 13) and/or various applications (e.g., an application program 1347 of FIG. 13) which are executed on the OS. The OS may be, for example, Android, iOS, Windows, Symbian, Tizen, or Bada, and the like.

The program module 1510 may include a kernel 1520, a middleware 1530, an application programming interface (API) 1560, and/or an application 1570. At least part of the program module 1510 may be preloaded on the electronic device, or may be downloaded from an external electronic device (e.g., a first external electronic device 1302, a second external electronic device 1304, or a server 1306, and the like of FIG. 13).

The kernel 1520 (e.g., a kernel 1341 of FIG. 13) may include, for example, a system resource manager 1521 and/or a device driver 1523. The system resource manager 1521 may control, assign, or collect, and the like system resources. According to an embodiment, the system resource manager 1521 may include a process management unit, a memory management unit, or a file system management unit, and the like. The device driver 1523 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 1530 (e.g., a middleware 1343 of FIG. 13) may provide, for example, functions the application 1570 needs in common, and may provide various functions to the application 1570 through the API 1560 such that the application 1570 efficiently uses limited system resources in the electronic device. According to an embodiment, the middleware 1530 (e.g., the middleware 1343) may include at least one of a runtime library 1535, an application manager 1541, a window manager 1542, a multimedia manager 1543, a resource manager 1544, a power manager 1545, a database manager 1546, a package manager 1547, a connectivity manager 1548, a notification manager 1549, a location manager 1550, a graphic manager 1551, a security manager 1552, or a payment manager 1554.

The runtime library 1535 may include, for example, a library module used by a compiler to add a new function through a programming language while the application 1570 is executed. The runtime library 1535 may perform a function about input and output management, memory management, or an arithmetic function.

The application manager 1541 may manage, for example, a life cycle of at least one of the application 1570. The window manager 1542 may manage graphic user interface (GUI) resources used on a screen of the electronic device. The multimedia manager 1543 may determine a format utilized for reproducing various media files and may encode or decode a media file using a codec corresponding to the corresponding format. The resource manager 1544 may manage source codes of at least one of the application 1570, and may manage resources of a memory or a storage space, and the like.

The power manager 1545 may act together with, for example, a basic input/output system (BIOS) and the like, may manage a battery or a power source, and may provide power information utilized for an operation of the electronic device. The database manager 1546 may generate, search, or change a database to be used in at least one of the application 1570. The package manager 1547 may manage installation or update of an application distributed by a type of a package file.

The connectivity manager 1548 may manage, for example, wireless connection such as Wi-Fi connection or BT connection, and the like. The notification manager 1549 may display or notify events, such as an arrival message, an appointment, and proximity notification, by a method which is not disturbed to the user. The location manager 1550 may manage location information of the electronic device. The graphic manager 1551 may manage a graphic effect to be provided to the user or a user interface (UI) related to the graphic effect. The security manager 1552 may provide all security functions utilized for system security or user authentication, and the like. According to an embodiment, when the electronic device (e.g., an electronic device 100 or 1301 of FIG. 1 or 13) has a phone function, the middleware 1530 may further include a telephony manager (not shown) for managing a voice or video communication function of the electronic device.

The middleware 1530 may include a middleware module which configures combinations of various functions of the above-described components. The middleware 1530 may provide a module which specializes according to kinds of OSs to provide a differentiated function. Also, the middleware 1530 may dynamically delete some of old components or may add new components.

The API 1560 (e.g., an API 1345 of FIG. 13) may be, for example, a set of API programming functions, and may be provided with different components according to OSs. For example, in case of Android or iOS, one API set may be provided according to platforms. In case of Tizen, two or more API sets may be provided according to platforms.

The application 1570 (e.g., an application program 1347 of FIG. 13) may include one or more of, for example, a home application 1571, a dialer application 1572, a short message service/multimedia message service (SMS/MMS) application 1573, an instant message (IM) application 1574, a browser application 1575, a camera application 1576, an alarm application 1577, a contact application 1578, a voice dial application 1579, an e-mail application 1580, a calendar application 1581, a media player application 1582, an album application 1583, a clock application 1584, a payment application 1585, or the like. Additionally, or alternatively, though not shown, the application 1570 may include, for example, and without limitation, a health care application (e.g., an application for measuring quantity of exercise or blood sugar, and the like), or an environment information application (e.g., an application for providing atmospheric pressure information, humidity information, or temperature information, and the like), and the like.

According to an embodiment, the application 1570 may include an application (hereinafter, for better understanding and ease of description, referred to as "information exchange application") for exchanging information between the electronic device (e.g., the electronic device 1301 of FIG. 13) and an external electronic device (e.g., the first external electronic device 1302 or the second external electronic device 1304). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 1302 or the second external electronic device 1304). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 1302 or the second external electronic device 1304) which communicates with the electronic device, an application which operates in the external electronic device, or a service (e.g., a call service or a message service) provided from the external electronic device.

According to an embodiment, the application 1570 may include an application (e.g., the health card application of a mobile medical device) which is preset according to attributes of the external electronic device (e.g., the first external electronic device 1302 or the second external electronic device 1304). According to an embodiment, the application 1570 may include an application received from the external electronic device (e.g., the server 1306, the first external electronic device 1302, or the second external electronic device 1304). According to an embodiment, the application 1570 may include a preloaded application or a third party application which may be downloaded from a server. Names of the components of the program module 1510 according to various embodiments of the present disclosure may differ according to kinds of OSs.

According to various embodiments, at least part of the program module 1510 may be implemented with software, firmware, hardware, or at least two or more combinations thereof. At least part of the program module 1510 may be implemented (e.g., executed) by, for example, a processor (e.g., a processor 1320 of FIG. 13). At least part of the program module 1510 may include, for example, a module, a program, a routine, sets of instructions, or a process, and the like for performing one or more functions.

The terminology "module" used herein may refer, for example, to a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include, for example, and without limitation, at least one of a dedicated processor, a CPU, an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

Example embodiments of the present disclosure described and illustrated in the drawings are provided as examples to describe technical content and help understanding but do not limit the present disclosure. Accordingly, it should be understood that besides the embodiments listed herein, all modifications or modified forms derived based on the technical ideas of the present disclosure are included in the present disclosure as defined in the claims, and their equivalents.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

A control unit, processor, controller, or the like, may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the figures may be implemented in hardware, software or a combination of both and may be performed in whole or in part within the programmed instructions of a computer. In addition, an artisan understands and appreciates that a "processor" or "microprocessor" may be hardware in the claimed disclosure.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
a first image sensor located at one surface of a housing of the electronic device and configured to provide a first angle of view;
a second image sensor located at the one surface of the housing and configured to provide a second angle of view; and
a processor operatively connected with the first image sensor and the second image sensor and configured to:
obtain a first image having first resolution for a plurality of objects located in the first angle of view of the first image sensor;
obtain a second image having a different second resolution for some objects located in the second angle of view among the plurality of objects using the second image sensor;
crop a third image having the second resolution, the third image corresponding to at least part of the some objects from the second image based on at least a depth-map using the first image and the second image, the depth-map based on a disparity value between the second image and a partial region of the first image, wherein the partial region of the first image corresponds to the second angle of view in the first image; and
compose the third image with a region corresponding to the at least part of the some objects in the first image.

2. The electronic device of claim 1, wherein the first resolution is higher than the second resolution.

3. The electronic device of claim 1, wherein the processor is configured to:
make at least part of the first image blurred as at least part of the composed third image.

4. An electronic device, comprising:
a first image sensor located at one surface of a housing of the electronic device and configured to provide a first angle of view;
a second image sensor located at the one surface and configured to provide a second angle of view;
a memory configured to store a first image captured by the first image sensor and a second image captured by the second image sensor; and
a processor configured to be electrically connected with the memory,
wherein the processor is configured to:
crop an object from the second image based on a depth-map based on a disparity value between the second image and a partial region of the first image, wherein the partial region of the first image corresponds to the second angle of the view in the first image; and
generate a composite image by composing the cropped object with the first image.

5. The electronic device of claim 4, wherein the processor is configured to:
obtain the first image and the second image within a specific time frame and in the same or similar direction using the first image sensor and the second image sensor, respectively.

6. The electronic device of claim 5, wherein the processor is configured to:
crop a region corresponding to the second angle of view from the first image; and
generate the depth-map based on at least part of the cropped region and at least part of the second image.

7. The electronic device of claim 4, wherein the processor is configured to:
read the first image, the second image, and an image including the depth-map from the memory in response to receiving an input.

8. The electronic device of claim 4, wherein the processor is configured to:
compose the cropped object with a location corresponding to the cropped object in the first image; or
blur the first image to a degree and compose the cropped object with a location corresponding to the cropped object in the blurred first image.

9. The electronic device of claim 4, wherein the processor is configured to:
blur the first image to a degree;
generate an out-of-focus image based on the object extracted from the second image; and
generate the composite image by stitching the blurred first image and the out-of-focus image.

10. The electronic device of claim 4, wherein the processor is configured to:
crop an object segmentation from the second image; and
generate the composite image by cropping a main object segmentation corresponding to the cropped object from the object segmentation based on the depth-map.

11. The electronic device of claim 4, wherein the processor is configured to:
blur the first image to a degree; and
generate a motion image configured to display a first composite image in which the cropped object is composed against a background of at least part of the first image and a second composite image in which a central object is composed against a background of at least part of the first image to be overlapped with each other and display the first composite image and the second composite image in a form where the second composite image is changed to the first composite image by adjusting a state where the first composite image is displayed and a state where the second composite image is displayed in a different way over time.

12. The electronic device of claim 4, wherein the processor is configured to generate at least one of:
a third image by blurring the first image to a first degree;
a fourth image by blurring the first image to a second degree;
a fifth image by composing the third image with the cropped object; and
a sixth image by composing the fourth image with the cropped object; and the processor is configured to sequentially display the fifth image and the sixth image.

13. An image composition method, the method comprising:
obtaining a first image captured at a first angle of view and at first resolution in a first direction using a first image sensor of an electronic device including the first image sensor, a second image sensor, a memory, and a processor;
obtaining a second image captured at a second angle of view and at second resolution in a same or similar direction to the first direction using the second image sensor;
cropping an object from the second image based on a depth-map generated based on at least part of the first image and at least part of the second image, the depth-map based on a disparity value between the second image and a partial region of the first image, the partial region of the first image corresponding to the second angle of view in the first image; and
generating a composite image by composing the cropped object with the first image.

14. The method of claim 13, wherein the obtaining of the second image comprises:
obtaining the first image and the second image within a specific time period in the same or similar direction using the first image sensor and the second image sensor, respectively.

15. The method of claim 13, further comprising:
cropping a region corresponding to the second angle of view from the first image; and
generating the depth-map based on the cropped region and the second image.

16. The method of claim 13, wherein the generating of the composite image comprises:
composing the cropped object with a location corresponding to the cropped object in the first image;
blurring the first image to a degree;
generating an out-of-focus image with respect to the object extracted from the second image; and
generating the composite image by stitching the blurred first image and the out-of-focus image.

17. The method of claim 13, further comprising:
blurring the first image to a degree; and
generating a motion image configured to display a first composite image in which the cropped object is composed against a background of at least part of the first image and a second composite image in which a central object is composed against a background of at least part of the first image to be overlapped with each other and display the first composite image and the second composite image in a form where the second composite image is changed to the first composite image by adjusting a state where the first composite image is displayed and a state where the second composite image is displayed in a different way over time.

18. The method of claim 13, further comprising:
outputting the motion image on a display of the electronic device; and
displaying the first composite image and the second composite image to vary in degree to which the second composite image is changed to the first composite image, in response to receiving an input.

19. The method of claim 13, further comprising at least one of:
generating a third image by blurring the first image to a first degree;
generating a fourth image by blurring the first image to a second degree;
generating a fifth image by composing the third image with the cropped object; and
generating a sixth image by composing the fourth image with the cropped object; and
sequentially displaying the fifth image and the sixth image.

20. The method of claim 13, wherein the generating of the composite image comprises:
cropping an object segmentation from the second image; and
generating the composite image by cropping a main object segmentation corresponding to the object from the object segmentation based on the depth-map.

* * * * *